(12) United States Patent
Chaar et al.

(10) Patent No.: US 9,922,341 B2
(45) Date of Patent: Mar. 20, 2018

(54) PROGRAMMING OPTIMIZATION UTILIZING A FRAMEWORK FOR AUDIENCE RATING ESTIMATION

(71) Applicant: Turner Broadcasting System, Inc., Atlanta, GA (US)

(72) Inventors: Wassim Samir Chaar, Coppell, TX (US); José Antonio Carbajal Orozco, Atlanta, GA (US); Peter Alexander Williams, Atlanta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 14/842,817

(22) Filed: Sep. 1, 2015

(65) Prior Publication Data

US 2017/0064395 A1    Mar. 2, 2017

(51) Int. Cl.
*H04N 21/262* (2011.01)
*H04N 21/258* (2011.01)
(Continued)

(52) U.S. Cl.
CPC ....... *G06Q 30/0244* (2013.01); *H04N 21/252* (2013.01); *H04N 21/258* (2013.01); *H04N 21/26208* (2013.01); *H04N 21/812* (2013.01)

(58) Field of Classification Search
CPC ............... H04N 21/482; H04N 21/437; H04N 21/25891; H04N 21/44222; H04N 21/25808; H04N 21/2668; H04N 21/4668; H04N 21/252; H04N 21/44204; H04N 21/812; H04N 21/26208; H04N 21/258; G06Q 30/0244
See application file for complete search history.

(56) References Cited

U.S. PATENT DOCUMENTS 6,947,450 B2    9/2005  Mangin
8,544,036 B2    9/2013  Bollapragada et al.
(Continued)

OTHER PUBLICATIONS

Araman, V., Popescu, I, 2010. Media revenue management with audience uncertainty: Balancing upfront and, pot market sales. Manufacturing & Service Operations Management 2 (12), 190-212.
(Continued)

*Primary Examiner* — Benjamin R Bruckart
*Assistant Examiner* — Aklil M Tesfaye
(74) *Attorney, Agent, or Firm* — Chip Law Group

(57) ABSTRACT

The television program scheduling system receives from one or more published data sources, historical audience data for previous telecasts of the shows on one or more television networks, and calibrates a model for audience rating estimation based on the historical audience data. The calibrated model for audience rating estimation may be utilized to generate estimates or projections of audience in the future. The television program scheduling system may generate an optimal schedule assignment of the shows to time periods that maximizes total resulting estimated audience based on the calibrated model for audience rating estimation. The generation utilizes a time expanded network in which each node represents an assignment of a show to a specific time period, with a specific stacking, and preceded by a lead-in show, and a feasible transition between two nodes represents a valid transition between two shows.

30 Claims, 12 Drawing Sheets

(51) Int. Cl.
*H04N 21/25* (2011.01)
*H04N 21/81* (2011.01)
*G06Q 30/02* (2012.01)

(56) References Cited

U.S. PATENT DOCUMENTS

| | | |
|---|---|---|
| 2003/0188308 A1 | 10/2003 | Kizuka |
| 2007/0033623 A1* | 2/2007 | Fredrickson ..... H04N 21/26241 725/88 |
| 2007/0288979 A1 | 12/2007 | Yen |
| 2008/0189178 A1 | 8/2008 | Schepers et al. |
| 2008/0189734 A1 | 8/2008 | Schepers et al. |
| 2008/0250447 A1 | 10/2008 | Rowe et al. |
| 2008/0263578 A1* | 10/2008 | Bayer ................ G06Q 30/02 725/9 |
| 2009/0006145 A1 | 1/2009 | Duggal et al. |
| 2009/0106082 A1 | 4/2009 | Senti et al. |
| 2009/0254932 A1 | 10/2009 | Wang et al. |
| 2010/0042496 A1 | 2/2010 | Wang et al. |
| 2010/0146542 A1 | 6/2010 | Weihs et al. |
| 2011/0078740 A1 | 3/2011 | Bolyukh et al. |
| 2012/0042338 A1 | 2/2012 | Kitts et al. |
| 2012/0167125 A1* | 6/2012 | Grubb ................ H04N 21/252 725/14 |
| 2013/0097629 A1 | 4/2013 | Popescu et al. |
| 2014/0006118 A1 | 1/2014 | Charania |
| 2014/0109123 A1* | 4/2014 | Balakrishnan ... H04N 21/44222 725/14 |
| 2015/0348091 A1* | 12/2015 | Haberman ......... G06Q 30/0244 705/14.43 |
| 2016/0117718 A1 | 4/2016 | Hood et al. |

OTHER PUBLICATIONS

Bertsimas, D. Tsitsiklis, J., 1997. Introduction to Linear Optimization. Athena Scientific, Belmont, Massachusetts.
Bollapragada, S., Bussieck, M., Mallik, S., 2004. Scheduling commercial videotapes in broadcast television. Operations Research 52 (5), 679-689.
Bollapragada, S., Cheng, H, Phillips, M., Scholes, M., Gibbs, T., Humphreville, M., 2002. Nbc's optimization systems increase its revenues and productivity. Interfaces 32 (1), 47-60.
Bollapragada, S., Garbiras, M., 2004. Scheduling commercials on broadcast television. Operations Research 52 (3), 337-345.
Danaher, P., Dagger, T., 2012. Using a nested legit model to forecast television ratings. International Journal of Forecasting 28 (3), 607-622.
Danaher, P., Dagger, T., Smith, M., 2011. Forecasting television ratings. International Journal of Forecasting 27 (4), 1215-1240.
Horen, J., 1980. Scheduling of network television programs. Management Science 26 (4), 354-370.
International Search Report and the Written Opinion of the International Searching Authority, or the Declaration, in International application No. PCT/US12/59857, dated Jan. 4, 2013. (11 pages).
Reddy, S., Aronson, J., Stam, A., 1998. Spot: Scheduling programs optimaly for television. Management Science 44(1), 83-102.

* cited by examiner

US 9,922,341 B2

PROGRAMMING OPTIMIZATION UTILIZING A FRAMEWORK FOR AUDIENCE RATING ESTIMATION

CROSS-REFERENCE TO RELATED APPLICATIONS/INCORPORATION BY REFERENCE

This application makes reference to:
U.S. application Ser. No. 14/842,799, which is filed concurrently herewith; and
U.S. application Ser. No. 14/842,808, which is filed concurrently herewith.

Each of the above referenced patent application and patent is hereby incorporated herein by reference in its entirety.

FIELD OF TECHNOLOGY

Certain embodiments of the disclosure relate to generating schedules that provide highest estimated audience. More specifically, certain embodiments of the disclosure relate to a method and system for programming optimization utilizing a framework for audience rating estimation.

BACKGROUND

The process of scheduling programs tends to be tedious and relies a lot on the experience and judgment of the programmers or programming planners. The goals of programming a TV schedule are geared geared towards scheduling programs in order to get the highest ratings, and/or to save on programming cost. Furthermore, the goals of sales is to maximize advertisement revenue through selling as much advertising capacity as possible at the highest possible price. Although sales may share the goal of maximizing ratings, they may want to utilize programs that are advertiser friendly to a greater extent that other programs. The programming goals and the sales goals often conflict.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for programming optimization utilizing a framework for audience rating estimation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for programming optimization utilizing a framework for audience rating estimation. The framework for audience rating estimation may also be referred to as a framework or model for audience estimation, or a model for audience rating estimation. Various embodiments of the disclosure provide for a television program scheduling system, for example, which may comprise a program manager, and a schedule generator. The television program scheduling system may communicate with a plurality of advertiser order generation systems and electronically receives, via a communication network, deals identifying shows and corresponding constraints for scheduling the shows. The television program scheduling system receives from one or more published data sources, historical audience data for previous telecasts of the shows on one or more television networks, and calibrates the model for audience rating estimation based on the historical audience data. The calibrated model for audience rating estimation may be utilized to generate estimates or projections of audience in the future. The television program scheduling system may generate an optimal schedule assignment of the shows to time periods that maximizes the total resulting estimated audience based on the calibrated model for audience rating estimation, wherein the generating utilizes a time expanded network in which each node represents an assignment of a show to a specific time period, with a specific stacking, and preceded by a lead-in show. A feasible transition between two nodes represents a valid transition between two shows.

The television program scheduling system may associate a profit or other metric with each feasible transition, and the profit or metric may represent an estimate of audience that would result from scheduling the transition between the two shows. The television program scheduling system determines a path between a source node and a sink node based on each of the feasible transitions, determines one or more paths between the source node and the sink node based on each of the feasible transitions, where each of the one or more paths represents a feasible schedule, and sums the profit associated with each feasible transition along each of the one or more paths. The television program scheduling system may be operable to determine which path of the one or more paths from the source node to the sink node comprise a maximum total profit, and designate the determined path having the maximum total profit as the optimal schedule assignment of the shows to time periods that maximizes the total resulting estimated audience. The calibration of the model for audience rating estimation may comprise translating characteristics of the shows into a plurality of variables, which are incorporated into the time expanded network. The generation of the optimal schedule assignment may comprise an iterative process.

Figure 1A:
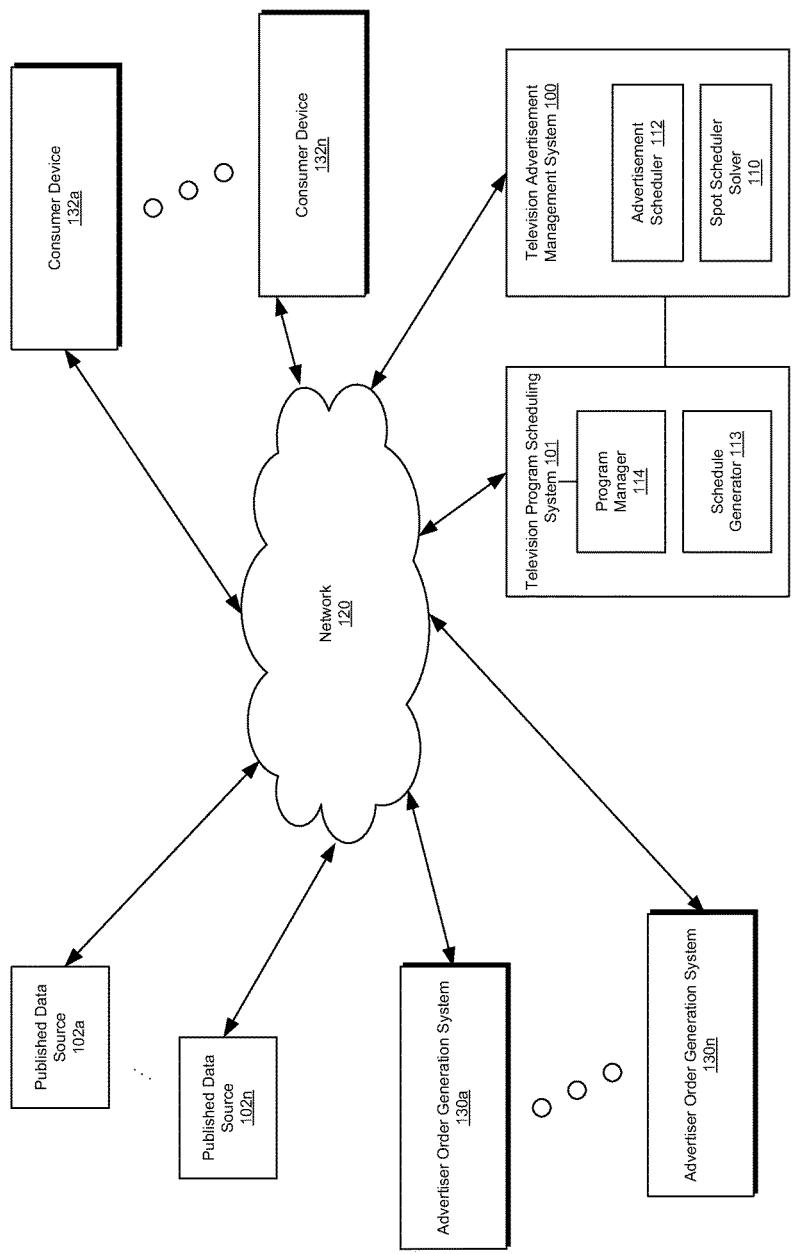
FIG. 1A is a block diagram that illustrates an exemplary system for receiving and processing spot scheduling orders, in accordance with an exemplary embodiment of the disclosure.

FIG. 1A is a block diagram that illustrates an exemplary system for receiving and processing spot scheduling orders, in accordance with an exemplary embodiment of the disclosure. Referring to FIG. 1A, there is shown a television advertisement scheduling system 100 that is communicatively coupled to advertiser order generation systems 130a, . . . , 130n, and published data sources 102a, . . . , 102n through a network 120. Consumer devices 132a, . . . , 132n are communicatively coupled to the network 120. The television advertisement scheduling system 100 may comprise a spot scheduler solver 110, an advertisement scheduler 112, a schedule generator 113, and a program manager 114.

The network 120 may be any kind of network, or a combination of various networks, and it is shown illustrating the communication that may occur between the advertiser order generation systems 130a, . . . , 130n and the television advertisement scheduling system 100. For example, the network 120 may comprise one or more of a cable television network, the Internet, a satellite communication network, a wide area network (WAN), a medium area network (MAN), and a local area network (LAN).

The television advertisement scheduling system 100 may be operated by a broadcasting company and may comprise a spot scheduler solver 110. The broadcast company may be operable to multicast content via a plurality of channels, for example, traditional over-the-air broadcast channels, cable television networks, satellite communication networks, the Internet, and/or other content delivery networks. The spot scheduler solver 110 may comprise suitable logic, circuitry, code, and/or interfaces that may be operable to receive orders from one or more of the advertiser order generation systems 130a, . . . , 130n to place advertisements spots into one or more commercial breaks that occur during television programming broadcast. That is, the spot scheduler solver 110 may be utilized to determine the appropriate scheduling of advertisement spots to produce a commercial break schedule according to the information provided by the advertiser order generation systems 130a, . . . , 130n. The advertiser order generation systems 130a, . . . , 130n may place orders with the broadcasting company that include information about the type of spots to be broadcast, the number of spots to be broadcast, and when should the spots be aired. In this regard, the advertiser order generation systems 130a, . . . , 130n may electronically book spots to a selling title (ST), and within the selling title there are constraints. The advertiser order generation systems 130a, . . . , 130n may provide multiple orders, which need not be submitted at the same time. Therefore, the spot scheduler solver 110 may continuously receive orders with new or additional spots to be placed and may need to update any previously determined commercial break schedule to accommodate the constraints and requirements of those spots already placed and of the new spots being received.

The television advertisement scheduling system 100 may have a cutoff after which orders submitted by the advertiser order generation systems 130a, . . . , 130n may not be considered by the spot scheduler solver 110 when preparing a next commercial break schedule. A commercial break schedule may include a final or complete schedule of the spots that are to appear during a specified period of television programming such as hours, days, weeks, or a combination thereof.

Various embodiments of the disclosure, the television advertisement scheduling system 100, may comprise a spot scheduler solver 110 and the advertisement scheduler 112, which are illustrated as separate entities, but may be integrated as a single entity depending on the implementation. The television advertisement scheduling system 100 may be operable to electronically receive, via the communication network 120, deals comprising advertisers orders from the plurality of advertiser order generation systems 130a, . . . , 130n. The spot scheduler solver 110 may be operable to receive an advertiser's order to place one or more spots into one or more commercial breaks. The advertiser's order comprises airing constraints and placement requirements corresponding to the one or more spots, and each of the one or more commercial breaks comprises a plurality of inventory buckets. The airing constraints corresponding to each of the one or more spots comprise one or more of network constraints, selling title constraints, inventory type constraints, allowable date and time constraints, and advertiser conflict constraints. The placement requirements corresponding to each of the one or more spots comprise one or more of associative constraints, position constraints, time separation constraints, franchise and/or title exclusion constraints, and spot pinning constraints. The associative constraints define the positioning of any two or more spots relative to each other within the same one of the at least one of the plurality of inventory buckets or in adjacent inventory buckets. The position constraints define the positioning of any one spot in one of the at least one of the plurality of inventory buckets and/or in a commercial break.

A position of each of the plurality of inventory buckets within each of the one or more commercial breaks may define a sequencing order of each of the inventory buckets within each of the one or more commercial breaks, and each of the plurality of inventory buckets comprise a corresponding inventory type that indicates a type of content in each of the plurality of inventory buckets. The spot scheduler solver 110 may be operable to assign each of the one or more spots to at least one of the plurality of inventory buckets that are within each of the one or more commercial breaks based on the airing constraints and placement requirements. The spot scheduler solver 110 may be operable to match the characteristics of the assigned at least one of the plurality of inventory buckets that are within each of the one or more commercial breaks with the airing constraints and requirements of each of the one or more spots. The spot scheduler solver 110 may be operable to rank the one or more spots that are within each of the assigned at least one of the plurality of inventory buckets that are within each of the one or more commercial breaks based on the matching such that the airing constraints and placement requirements corresponding to the one or more spots are fulfilled. The spot scheduler solver 110 may be operable to reshuffle the one or more spots that are within each of the assigned at least one of the plurality of inventory buckets that are within each of the one or more commercial breaks. When at least one of the one or more spots are not assigned to the at least one of the plurality of inventory buckets that are within each of the one or more commercial breaks because of conflicts, the spot scheduler solver 110 may be operable to perform a prioritization scheme to complete the assignment of the one or more spots that are not assigned. The spot scheduler solver 110 may be operable to prioritize the spots based on arrival lead time such that all spots for a particular order are given same priority, and priorities are chosen such that a sum of all priorities post a certain arrival time is less than a priority on any spot prior to the certain arrival time. The spot scheduler solver 110 may also be operable to maximize the sum of the rates corresponding to the one or more spots. The spot scheduler solver 110 may also be operable to maximize the spread of days in which the one or more spots occur over the duration of the commercial break schedule. The spot scheduler solver 110 may be operable to generate a commercial break schedule based on the completed assignment of the one or more spots that are not assigned. It should readily be understood by one of skill in the art that other metrics may be utilized without departing from the spirit and scope of the various embodiments of the disclosure.

The spot scheduler solver 110 may also be operable to receive an additional advertiser's order to place one or more additional spots into the one or more commercial breaks, wherein the additional advertiser's order comprises constraints and placement requirements corresponding to the one or more additional spots. The spot scheduler solver 110 may also be operable to assign each of the one or more spots and the one or more additional spots to at least one of the plurality of inventory buckets within the one or more commercial breaks based on the corresponding constraints and placement requirements. When at least one of the one or more spots and the one or more additional spots is not assigned because of conflicts, the spot scheduler solver 110 may also be operable to a perform a prioritization scheme to complete the assignment of the at least one spot that is not assigned. The spot scheduler solver 110 may also be operable to modify the generated commercial break schedule based on the completed assignment of the at least one spot that is not assigned. The spot scheduler solver 110 may be operable to communicate the generated commercial break schedule to the advertisement scheduler 112 for processing.

The advertisement scheduler 112 may be operable to receive the generated commercial break schedule, and determine a current indexing representative of the liability per pending spot for one or more of the deals. The advertisement scheduler 112 may be operable to reshuffle and prioritize the placement of the one or more spots based on one or more metrics such as a current indexing of the one or more deals in order to minimize liability associated with the one or more deals. The current indexing represents the projected liability of a pending spot and is determined based on what has already been aired, and what will be aired in the future. The reshuffling may be based on a forecast of expected viewership associated with the one or more deals. The advertisement scheduler 112 may be operable to generate a finalized commercial break schedule based on the reshuffling and apply the finalized schedule to the log. It should readily be understood by one of skill in the art that the other metrics other than the current indexing, which represents the projected liability per pending spot, may be utilized without departing from the spirit and scope of the various embodiments of the disclosure.

In accordance with various embodiments of the disclosure, an advertisement management system 100, which comprises a spot scheduler solver 110 and an advertisement scheduler 112, is operable to communicate with a plurality of advertiser order generation systems 130a, . . . , 130n, and electronically receives, via a communication network 120, deals comprising advertiser orders. The advertisement scheduler 112 receives a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement scheduler 112 may determine a current indexing for one or more of the deals, and reshuffles the placement of the one or more spots based on the current indexing of the one or more deals in order to minimize liability associated with the one or more deals. The reshuffling is based on a forecast of expected viewership associated with the one or more deals. The reshuffling of the placement of the one or more spots is done across one or more channels that airs the one or more spots. The advertisement scheduler 112 may generate a finalized commercial break schedule based on the reshuffling. The expected viewership may be forecasted for a particular period based in the status of prior logs. As an example, and without limitation, the expected viewership may be forecasted based on the status of the prior logs for an upcoming 7-day period.

The advertisement scheduler 112 may update a current forecast of expected viewership at the end of the particular period based on actual ratings for a prior week, which may be derived at last in part from Nielsen ratings. The advertisement scheduler 112 may maximize delivery for candidates deals that are under-delivering or are not pacing as expected, where pacing is a computation of of cumulative demographics guaranteed so far, that is, at a particular point in time. The advertisement scheduler 112 may reshuffle the placement of the one or more spots such that the candidate spots get maximum delivery in order to minimize the liability. For example, the advertisement scheduler 112 may determine or identify candidate spots with liability above a certain value such as a threshold value, which indicates that the deals are not pacing as expected, and may reshuffle the placement of the one or more spots such that the candidate spots achieve maximum delivery, thereby minimizing liability. The candidate spots may be determined or identified based on their current delivery value. The advertisement scheduler 112 may determine each demographic for each of the one or more deals and generate, for each demographic, an estimate of the expected viewership associated with the one or more deals.

The advertisement scheduler 112 may generate the estimate of the expected viewership for specified time intervals. The time intervals may be, for example, 30-minute time intervals. The advertisement scheduler 112 may determine a current indexing for each of a plurality of the deals, and provide preferential treatment to placement of the one or more spots for one or more of the plurality of deals having greatest liability based on the determined current indexing when performing the reshuffling. The advertisement scheduler 112 may modify the forecast of expected viewership associated with the one or more deals based on a weighting factor, which may be updatable. The advertisement scheduler 112 may update the weighting factor over time to improve the current indexing of the one or more deals over time.

In accordance with an exemplary embodiment of the disclosure, the resulting estimates or the updated/adjusted estimates may be weighted by a weighting factor. The weighting factor may be generated based on analysis of historical analysis of demographics estimates, for every demographics, for every network including what is airing on the networks of competitors, at the 30-minute interval, and for an extended period, for example, one or more months, or one or more years. The weighting factor may take on a range of values, each of which may be updated.

In instances where the estimates may be dependent on previous estimates, then a weighting factor may be utilized in combination with the previous estimate to weigh the error of the previous estimate and measurement. The weighting factor may be: (i) a constant: it may be a system parameter chosen based on data and model performance analysis, for example, prior to system roll out. This constant can be reassessed, if need, periodically e.g. yearly; (ii) time-varying: the weight changes at every time step depending on the estimates and observations variance; (iii) adaptive: the weight changes at every time step as a function of the estimates error variance. In this regard, the adaptive weight may be viewed as time varying as a function of error.

The published data sources 102a, . . . , 102n may be coupled to a plurality of television networks and are operable to provide projections of the audience for programs that were aired. An exemplary published data source may be Nielsen.

The schedule generator 113 may comprise suitable logic, circuitry, and interfaces that may be operable to execute code that handles the generation of an optimized schedule that provides the highest estimated audience. In this regard, the schedule generator 113 may receive characteristics associated the programs or shows, and utilize a calibrated model for audience rating estimation to determine an optimal schedule assignment of programs or shows to time periods on a schedule that will maximize the total resulting estimated audience. The characteristics or options among shows or programs may vary. The characteristics or options of a program or show may include constraints such as the minimum and maximum number of times a program may be telecast. The schedule generator 113 may be operable to acquire from the published data sources 102a, . . . , 102n, historical audience data for programs that were aired. The historical audience data may be acquired from one or more sources such as Nielsen. The schedule generator 113 may be operable to calibrate the model for audience rating estimation. The calibration of the model for audience rating estimation may comprise translating characteristics of one the television programs or shows into a plurality of variables. The schedule generator 113 may be operable to incorporate the plurality of translated variables into the time expanded network, which is utilized to generate an optimal schedule that provides the highest estimated audience.

Figure 1B:
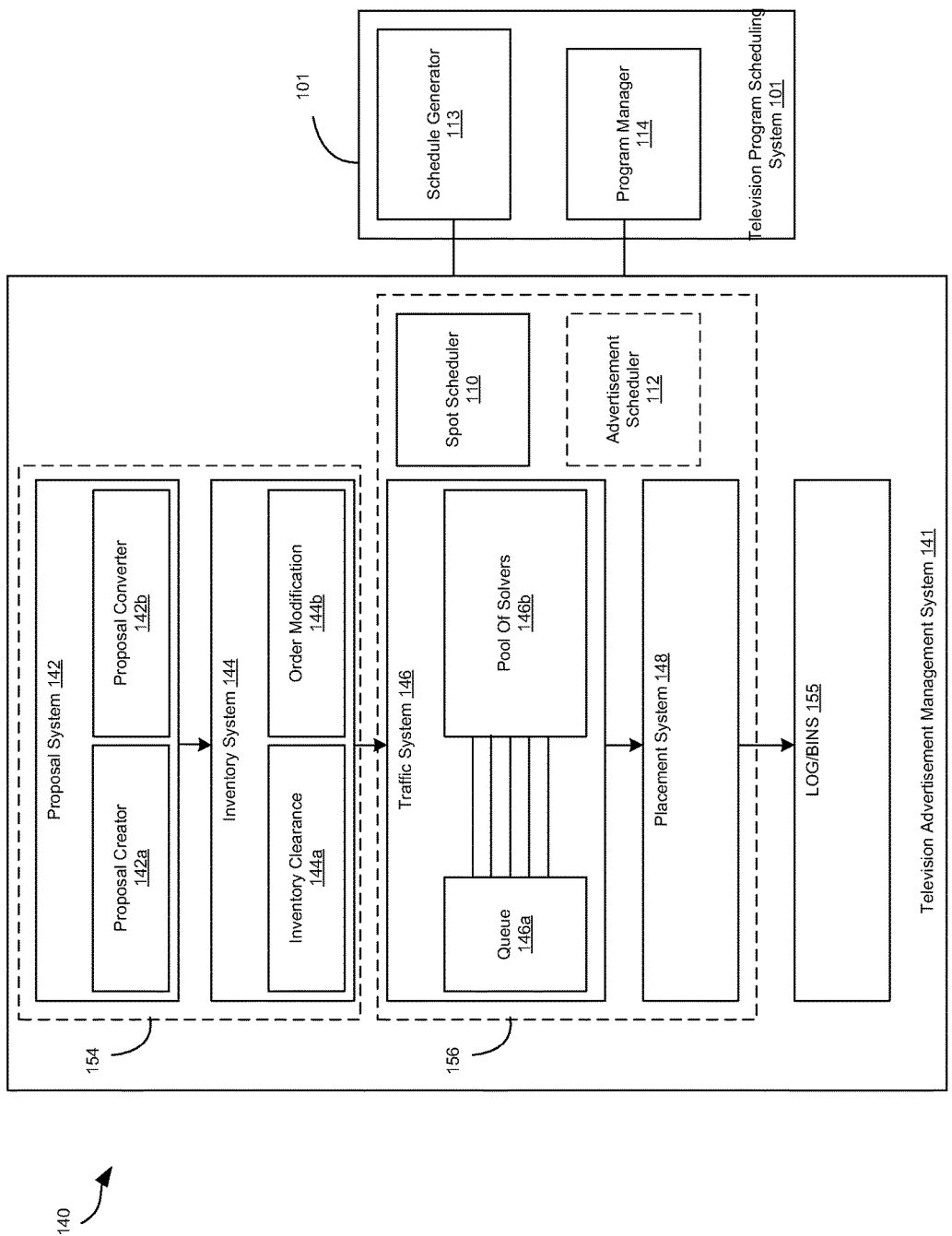
FIG. 1B is a diagram of the television management system, in accordance with an exemplary embodiment of the disclosure.

The program manager 114 may comprise suitable logic, circuitry, and interfaces that may be operable to execute code that may be operable to manage the scheduling of programs in the television advertisement management system 100. For example, the program manager 114 may be operable to control the number of times that a program may be aired. The program manager 114 may be operable to receive one or more optimal schedules that may be generated by the schedule generator 113, and may communicate the one or more optimal schedules to the traffic system 146 (FIG. 1B). The traffic system 146 may communicate information from the optimal schedules to, for example, the spot scheduler 110, and/or the advertisement scheduler 112. For example, the program manager 114 or the traffic system 146 may be operable to communicate information from the optimal schedule to (1) the spot scheduler 110, which may be operable to utilize the information from the optimal schedule to control the placement of one or more spots, and/or (2) the advertisement scheduler 112, which may be operable to shuffle placement of the one or more spots based liability per pending spot or other metric. The program manager 114 may also be operable to communicate information from the optimal schedule to a targeting processor 117 (FIG. 3A), which may utilize the information from the optimal schedules to control the targeting of one or more spots.

FIG. 1B is a diagram of the television management system, in accordance with an exemplary embodiment of the disclosure. Referring to FIG. 1B, there is shown a television management system 140 comprising a television program scheduling system 101, and a television advertisement management system 141, which may be similar to the television advertisement management system 100 of FIG. 1A. The television advertisement management system 141 comprises proposal system 142, inventory system 144, traffic system 146, placement system 148, spot scheduler 110, and an advertisement scheduler 112. The television program scheduling system 101 comprises a schedule generator 113, and program manager 114. The proposal system 142, and the inventory system 144 may be referred to as an order booking system 154.

The proposal system 142 comprises hardware systems that are operable to create and negotiate proposals with the advertiser order generation systems 130a, . . . , 130n, which are illustrated in FIG. 1A, to produce one or more deals. A negotiated deal may have one or more orders. Each order is specific to a single network for a single brand. The same order may not span multiple networks. The proposal system 142 comprises proposal creator 142a, and proposal converter 142b. The proposal creator 142a is operable to create and negotiate the proposals. The proposal converter 142b is operable to accept and convert the negotiated proposals to one or more orders.

The inventory system 144 comprises inventory clearance system 144a, and order modification system 144b. The inventory clearance system 144a is operable to clear the orders based on available inventory. The orders may be cleared, for example, on a first come first serve (FCFS) basis. When an order is received, the order may specify the x units be placed in selling title week A, y units be placed in selling title week B, and z units be placed in selling title week C, for example. Since there may be multiple bookings occurring, the inventory clearance system 144a ensures the availability of the inventory for booking the required units for the order. The order modification system 144b may be operable to change the attributes associated with an order that has already cleared inventory, add one or more units for an order to the inventory, or delete one or more units from inventory.

The traffic system 146 may comprise suitable hardware that may be operable to receive cleared and/or modified orders and queue them for assignment to an available spot scheduler solver. In this regard, the traffic system 146a may comprise a hardware queue 146a, and a plurality of spot scheduler solvers 146b. The queue 146a may be operable to queue cleared and/or modified orders by the traffic system 146. The traffic system 146 may assign the cleared and/or modified orders that are queued in the queue 146a to an available spots scheduler solver in the pool of spot scheduler solvers 146b for spot scheduling. The placement system 148 is operable to place the spots on the logs/bins 155 based on the results from the spot scheduler solvers.

The advertisement scheduler 150 may be operable to receive the generated commercial break schedule, and determine a current indexing representative of the liability per pending spot for one or more of the deals. The advertisement scheduler 150 may be operable to reshuffle and prioritize the placement of the one or more spots based on one or more metrics such as a current indexing of the one or more deals in order to minimize liability associated with the one or more deals. The current indexing represents the projected liability of a pending spot and is determined based on what has already been aired, and what will be aired in the future. The reshuffling may be based on a forecast of expected viewership associated with the one or more deals. The advertisement scheduler 150 may be operable to generate a finalized commercial break schedule based on the reshuffling and apply the finalized schedule to the log. It should readily be understood by one of skill in the art that the other metrics other than the current indexing, which represents the projected liability per pending spot, may be utilized without departing from the spirit and scope of the various embodiments of the disclosure.

The schedule generator 113 may be operable to handle the generation of an optimized schedule that will provide the highest estimated audience. The schedule generator 113 may receive characteristics for a program or show, and may acquire historical audience data for programs that were aired. The historical audience data may be acquired from one or more sources such as Nielsen. The schedule generator 113 may be operable to calibrate a model for audience rating estimation based on the historical audience data. The calibration of the model for audience rating estimation may include translating characteristics of the shows into a plurality of variables, and incorporating the plurality of translated variables into the time expanded network. The calibrated model for audience rating estimation may be utilized to generate estimated projection of audience in the future. The schedule generator 113 may be operable to utilize the time expanded network to generate an optimal schedule that provides the highest estimated audience. In this regard, the schedule generator 113 may be operable to utilize programming optimization to find an optimal schedule assignment of programs or shows to time periods that will maximize the total resulting estimated audience.

The program manager 114 manages the scheduling of programs in the television advertisement management system 100, and may control, for example, the number of times that a program may be aired. The program manager 114 may receive one or more optimal schedules that may be generated by the schedule generator 113, and may communicate the one or more optimal schedules to the traffic system 146 (FIG. 1B). The traffic system 146 may communicate information from the optimal schedules to the spot scheduler 110, and/or the advertisement scheduler 112. The spot scheduler 110 may be operable to utilize the information from the optimal schedule to control the placement of one or more spots. In one aspect of the disclosure, the program manager 114 may be operable to communicate information related to one or more optimal schedules to the advertisement scheduler 112, and the advertisement scheduler 112 may be operable to utilize the information from the optimal schedule to shuffle placement of the one or more spots based liability per pending spot or other metric. In another aspect of the disclosure, the program manager 114 may be operable to communicate information related to one or more optimal schedules to a targeting processor 117 (FIG. 3A), and the targeting processor 117 may be operable to utilize this information to control the targeting of spots.

Orders requiring advertisement scheduling may be processed by the advertisement scheduler 150 and placed on the logs/bins based on the results from the advertisement scheduler 150.

Figure 1C:
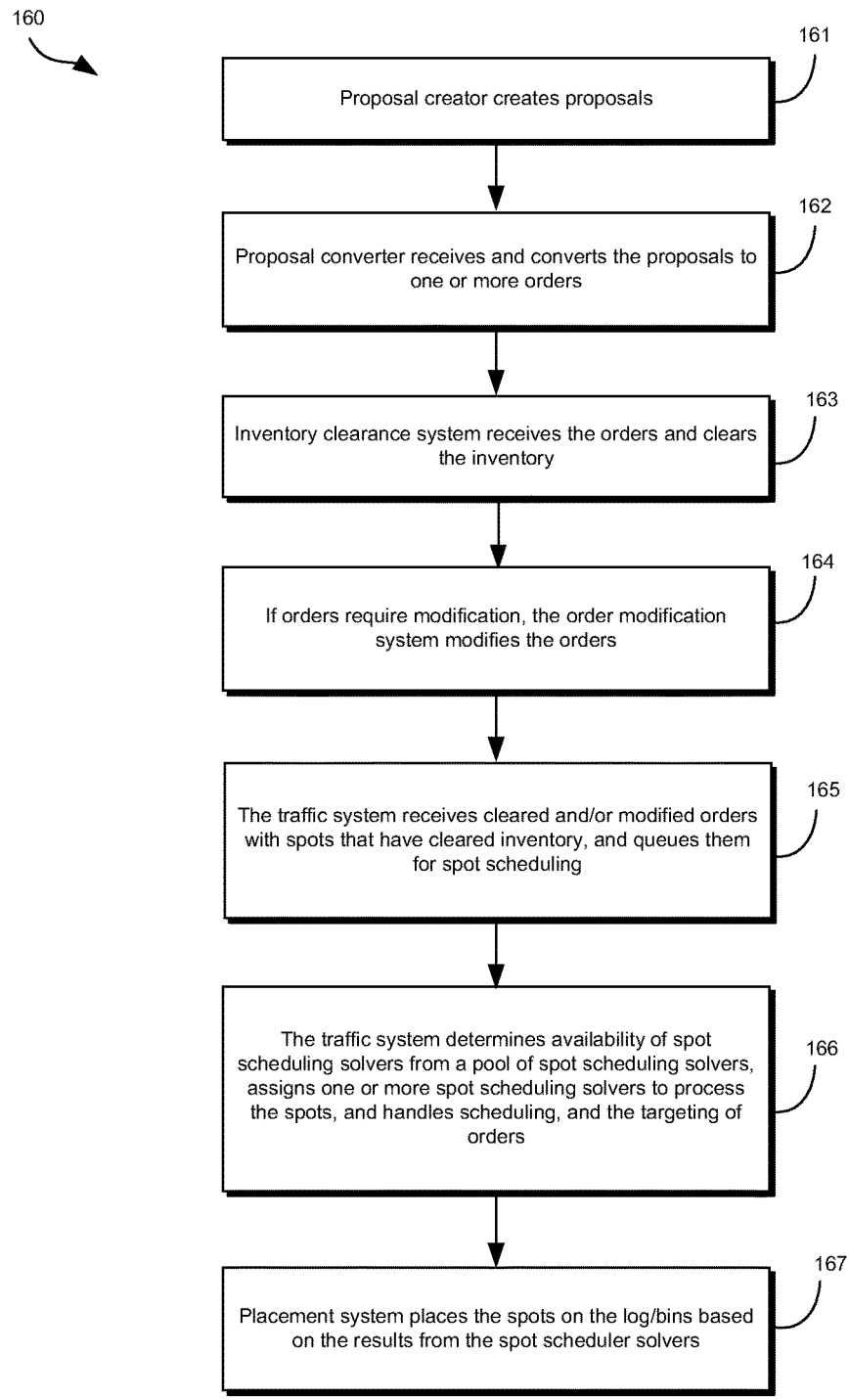
FIG. 1C is a flow chart illustrating high-level operation of the television advertisement management system of FIG. 1B, in accordance with an exemplary embodiment of the disclosure.

FIG. 1C is a flow chart illustrating high-level operation of the television advertisement management system of FIG. 1B, in accordance with an exemplary embodiment of the disclosure. Referring to FIG. 1C, there are shown exemplary steps 161 through 167. In step 161, the proposal creator 142a creates proposals. In step 162, the proposal converter 142b receives and converts the proposals to one or more orders. In step 163, the inventory clearance system 144a receives the orders and clears the inventory. In step 164, if orders require modification, the order modification system 144b modifies the orders. In step 165, the traffic system 146 receives cleared and/or modified orders with spots that have cleared inventory and queues them in the queue 146a for spot scheduling. In step 166, the traffic system 146 determines availability of spot scheduling solvers from a pool of spot scheduling solvers 146b, assigns one or more spot scheduling solvers to process the spots. In step 167, the placement system 148 places the spots on the log/bins 155 based on the results from the spot scheduler solvers.

Figure 2A:
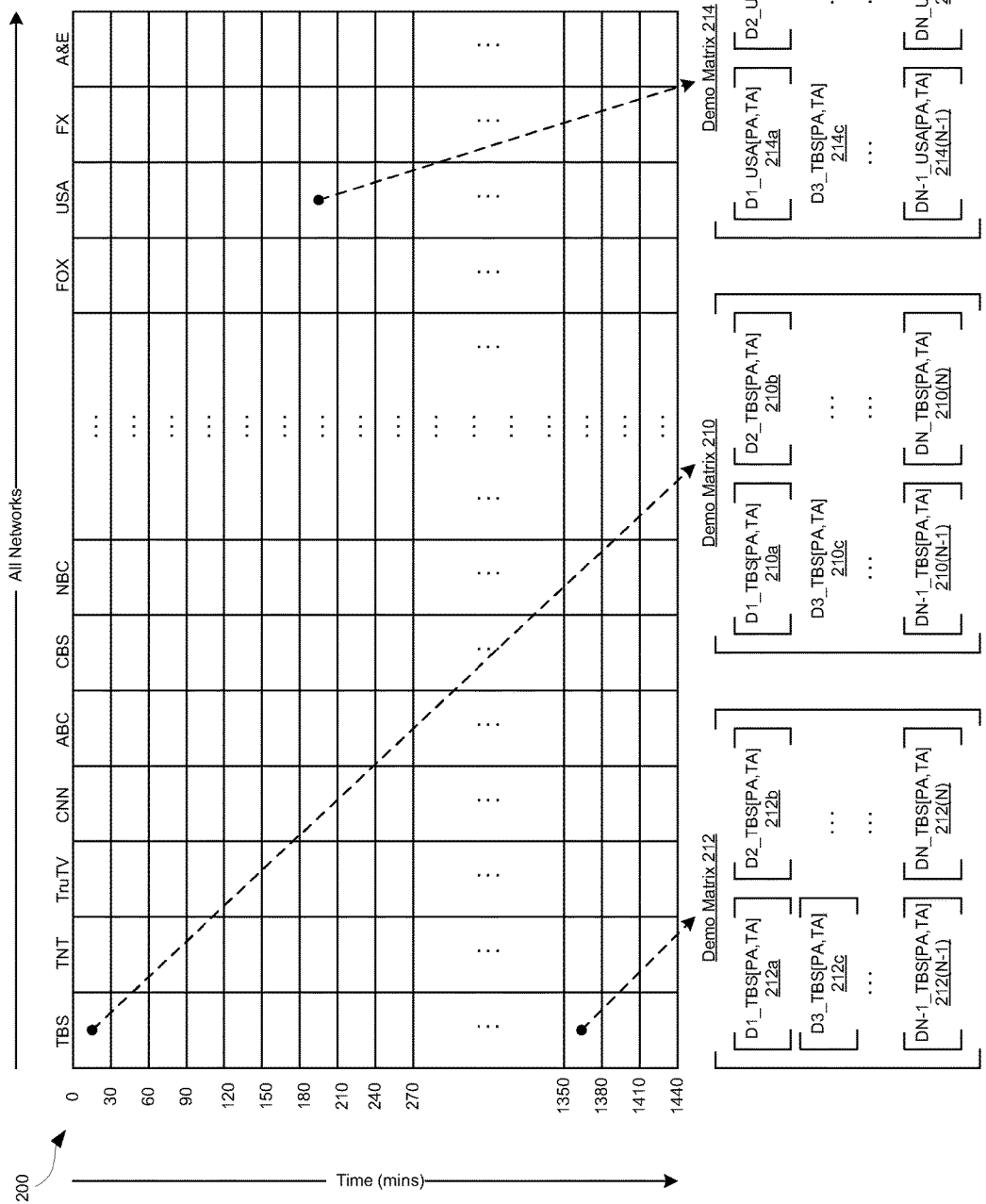
FIG. 2A is a diagram that illustrates a framework for audience rating estimation for a media system, in accordance with various exemplary embodiments of the disclosure.

FIG. 2A is a diagram that illustrates a framework for audience rating estimation for a media system, in accordance with various exemplary embodiments of the disclosure. Referring to FIG. 2A, there is shown an exemplary base matrix 200 comprising a plurality of columns and a plurality of rows. Each of the plurality of columns represents a particular network among all networks, and each of the rows represents the 48 30-minute periods/segments in a day (24-hour period). As illustrated, there are shown exemplary networks, TBS, TNT, TruTV, CNN, ABC, CBS, NBC, . . . , FOX, USA, FX, and A&E. The framework for audience rating estimation may be referred to generally as a model for audience rating estimation. The base matrix 200 may comprise a grid, which generally illustrates exemplary creation of variables that may be utilized in the framework for audience rating estimation or model.

Each element in the base matrix 200 may be represented by a demo matrix, which comprises a plurality of demo matrix elements, representing target demographics. For example, demo matrix 210 represents all the demographics for TBS network, for the 0-30 ($1^{st}$) 30-minute period. The demo matrix 210 comprises demo matrix elements 210a, 210b, 210c, . . . , 210(N-1), 210N, where N is an integer greater than 1. Demo matrix element 210a comprises a first demo D1 for TBS, which includes all program attributes (PA), and time attributes (TA), and is collectively represented as D1_TBS[PA,TA]. Demo matrix element 210b comprises a second demo D2 for TBS, which includes all program attributes (PA), and time attributes (TA), and is collectively represented as D2_TBS[PA,TA]. Demo matrix element 210c comprises a third demo D3 for TBS, which includes all program attributes (PA), and time attributes (TA), and is collectively represented as D3_TBS [PA,TA]. . . . Demo matrix element 210(N-1) comprises a (N-1)$^{th}$ demo D(N-1) for TBS, which includes all program attributes (PA), and time attributes (TA), and is collectively represented as DN-1_TBS[PA,TA]. Demo matrix element 210(N) comprises a N$^{th}$ demo D(N) for TBS, which includes all program attributes (PA), and time attributes (TA), and is collectively represented as DN-1_TBS[PA,TA].

The demo matrix 212 represents all the demographics for TBS network, for the 1350-1380 (46$^{th}$) 30-minute period. The demo matrix 212 comprises demo matrix elements 212a, 212b, 212c, . . . , 212(N-1), 212N, where N is an integer greater than 1. Demo matrix element 212a comprises a first demo D1 for TBS, which includes all program attributes (PA), and time attributes (TA), and is collectively represented as D1_TBS[PA,TA]. Demo matrix element 212b comprises a second demo D2 for TBS, which includes all program attributes (PA), and time attributes (TA), and is collectively represented as D2_TBS[PA,TA]. Demo matrix element 212c comprises a third demo D3 for TBS, which includes all program attributes (PA), and time attributes (TA), and is collectively represented as D3_TBS[PA,TA]. . . . Demo matrix element 212(N-1) comprises a (N-1)$^{th}$ demo D(N-1) for TBS, which includes all program attributes (PA), and time attributes (TA), and is collectively represented as DN-1_TBS[PA,TA]. Demo matrix element 212(N) comprises a N$^{th}$ demo D(N) for TBS, which includes all program attributes (PA), and time attributes (TA), and is collectively represented as DN-1_TBS[PA,TA].

The demo matrix 214 represents all the demographics for USA network, for the 180-210 (7$^{th}$) 30-minute period. The demo matrix 214 comprises demo matrix elements 214a, 214b, 214c, . . . , 214(N-1), 214N, where N is an integer greater than 1. Demo matrix element 214a comprises a first demo D1 for USA, which includes all program attributes (PA), and time attributes (TA), and is collectively represented as D1_USA[PA,TA]. Demo matrix element 214b comprises a second demo D2 for USA, which includes all program attributes (PA), and time attributes (TA), and is collectively represented as D2_USA[PA,TA]. Demo matrix element 214c comprises a third demo D3 for USA, which includes all program attributes (PA), and time attributes (TA), and is collectively represented as D3_USA [PA,TA]. . . . Demo matrix element 214(N-1) comprises a (N-1)$^{th}$ demo D(N-1) for USA, which includes all program attributes (PA), and time attributes (TA), and is collectively represented as DN-1_USA[PA,TA]. Demo matrix element 214(N) comprises a N$^{th}$ demo D(N) for USA, which includes all program attributes (PA), and time attributes (TA), and is collectively represented as DN-1_USA[PA,TA].

Each demo matrix element for each network includes program attributes, and time attributes, which may be represented as a matrix [PA,TA]. Exemplary time attributes may comprise the following:

Quarter, Year (if necessary), which may be represented as variables;
Daily seasonality, which may be represented as a linear combination of trigonometric functions;
Day of week (DOW), which may be represent as variables;
Half hour, which may be represented as variables, for example, 8:00-8:30, 8:30-9:00;
Holidays and special events, for example, Super Bowl, Labor Day Sunday and Monday, 4$^{th}$ of July (Independence Day), Christmas Day, and New Year's Eve, and may be represented as variable.

Exemplary program attributes may comprise the following:

Genre by network/competitor:
a. "light content" (soap, comedy, variety, game, music, reality);
b. "heavy content" (documentary, drama, current affairs, news, science, travel);
c. sport;
d. Movies; and
e. News;
for each type of competitor (bucket), for example, Broadcast light content, Non-Owned Cable light content;
Repeat/Premiere/Live (from Nielsen)
Duration (in min)
Same program indicator—half hour (hhr) is within same program as previous (calculated)
Lead in genre match—half hour (hhr) starts a program similar with previous hhr's program (calculated), where genre is light, heavy, sports or movies It should be recognized by those skilled in the art that other time attributes and/or program attributes may be utilized without departing from the spirit and/or scope of the various embodiments of the disclosure. See, for example, Danaher, Peter and Dagger, Tracey, Using a nested logit model to forecast television ratings, *International Journal of Forecasting*, 28, issue 3, p. 607-622.

In an exemplary approach for estimating audience, for a given 30-minute period, the probability of a consumer choosing to watch what is on a particular channel is a function of what is currently airing on that particular channel, and what the competitors are airing within the same 30-minute period. For example, the probability for a consumer watching TBS network for a given 30-minute period, $P_{hhr,TBS}$ may be represented by the following expression:

$$P_{hhr,TBS} = \frac{e^{\beta_{TBS} \cdot x_{P_{hhr,TBS}}}}{\sum_{i=TBS}^{Others} e^{\beta_i \cdot x_{P_{hhr,i}}}} \quad \text{(equation 1)}$$

where:
x=program attributes and time attributes;
β=vector of weights to be estimated for a particular network e.g. $\beta_{TBS}$=vector of weights to be estimated for TBS.

The program attributes and time attributes may be referred to as covariates, and may be received from one or more entities and/or storage devices that provide media analytical information, for example, Nielsen.

Using equation 1, the projection of the audience impressions for a focus network may be represented as follows:

$$ln(\text{Demo}(000)_{hhr,TBS}) = \beta_{TBS} \cdot x_{P_{hhr,TBS}} \quad \text{(equation 2)}$$

In accordance with an exemplary embodiment of the disclosure, equation 2 may be estimated utilizing maximum likelihood estimation techniques. It should readily be understood that other approaches and/or variations may be utilized without departing from the spirit and scope of the various embodiments of the disclosure.

In accordance with various embodiments of the disclosure, the competitor networks may be bucketized, i.e. placed into buckets or bins in order to generate variables to inform the model for audience rating estimation. This builds up the variables to incorporate in the model described above. The following illustrates are exemplary competitor buckets:

Owned competitors—for example, TBS, TNT, ADSM, TruTV, etc are owned by the same entity, and thus compete against each other;

Broadcast competitors—ABC, CBS, NBC, FOX, CW, ION;

Non-Owned cable competitors—USA, Spike, FX, A&E, Lifetime, CMDY; and

All other networks.

The base matrix 200 as illustrated contains data for a single day. The structure of the base matrix 200 may be replicated 365 times and populated with the corresponding program attributes and time attributes for a single year. This resulting structure may be replicated and populated with the corresponding program attributes and time attributes to provide a corresponding plurality of years of data.

Figure 2B:
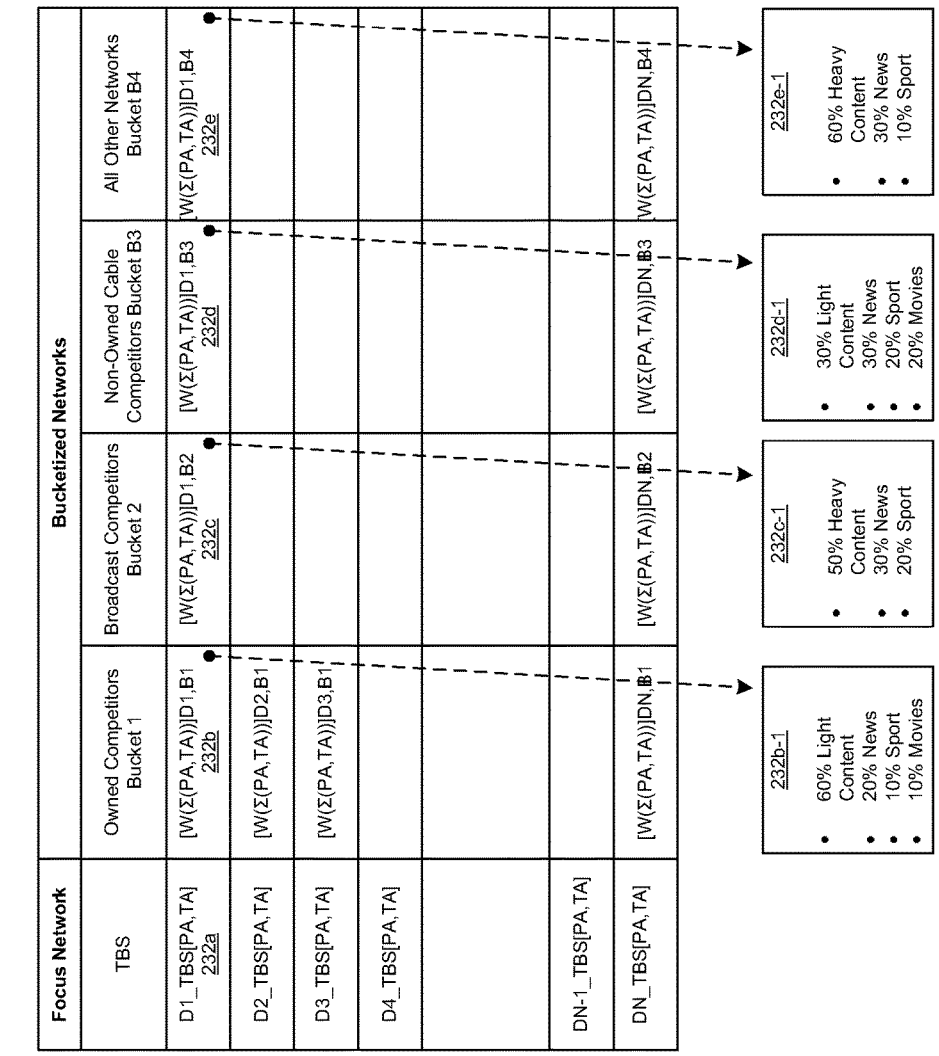
FIG. 2B is a diagram that illustrates a focus network determination for the framework for audience rating estimation for the media system of FIG. 2A, in accordance with various exemplary embodiments of the disclosure.

FIG. 2B is a diagram that illustrates a focus network determination for the framework for audience rating estimation for the media system of FIG. 2A, in accordance with various exemplary embodiments of the disclosure. Referring to FIG. 2B, there is shown an exemplary focus matrix 230 including a focus network, TBS, and the bucketized networks in buckets, B1, B2, B3, and B4. The focus matrix 230 represents information for the 0-30 minute period of the base matrix 200 illustrated in FIG. 2A. A similar matrix may be generated for each remaining 23 time periods for TBS, which are illustrated in FIG. 2A.

Consider the first demo D1 in the 0-30 minute period (FIG. 2A), for TBS, with the program attributes PA, and time attributes TA, collective referenced as D1_TBS[PA,TA], 232a. The values for D1_TBS[PA,TA] are acquired from the demo matrix element 210a, in FIG. 2A. For the first demo D1, a vector of the sum ($\Sigma$(PA,TA)) of program attributes and the time attributes for the each of the owned competitor networks, which are in bucket 1 is determined. The vector of the sum ($\Sigma$(PA,TA)) is determined by adding the individual contribution for each owned competitor network in bucket B1, which is found in the row for 0-30 minute (first 30-minute) period of the base matrix 200 illustrated in FIG. 2A, for a period of, for example, 1 year. Since different shows may be presented in the 0-30 minute period, the vector of the sum ($\Sigma$(PA,TA)) for bucket B1 is weighted. The resulting weighted vector for the summed attributes of content for the networks in bucket B1, may be represented as [W($\Sigma$(PA,TA))]D1,B1]. An example weighted vector for the summed attributes of content for the networks in bucket B1 may comprise 60% light content, 20% news, 10% sport, and 10% movies, and is represented by reference number 232b-1.

Bucket B2 is handled in a similar manner as bucket B1. In this regard, the vector of the sum ($\Sigma$(PA,TA)) is determined by adding the individual contribution for each owned competitor network in bucket B2, which is found in the row for 0-30 minute (first 30-miniute) period of the base matrix 200 illustrated in FIG. 2A, for a period of, for example, 1 year. Since different shows may be presented in the 0-30 minute period, the vector of the sum ($\Sigma$(PA,TA)) for bucket B2 is weighted. The resulting weighted vector for the summed attributes of content for the networks in bucket B1, may be represented as [W($\Sigma$(PA,TA))]D1,B2]. An example weighted vector for the summed attributes of content for the networks in bucket B2 may comprise 50% heavy content, 30% news, and 20% sport, and is represented by reference number 232c-1.

Bucket B3 is handled in a similar manner as buckets B1, and B2. In this regard, the vector of the sum ($\Sigma$(PA,TA)) is determined by adding the individual contribution for each owned competitor network in bucket B3, which is found in the row for 0-30 minute (first 30-miniute) period of the base matrix 200 illustrated in FIG. 2A, for a period of, for example, 1 year. Since different shows may be presented in the 0-30 minute period, the vector of the sum ($\Sigma$(PA,TA)) for bucket B3 is weighted. The resulting weighted vector for the summed attributes of content for the networks in bucket B3, may be represented as [W($\Sigma$(PA,TA))]D1,Bed]. An example weighted vector for the summed attributes of content for the networks in bucket B2 may comprise 30% light content, 30% news, 20% sport, and 20% movies, and is represented by reference number 232d-1.

Bucket B4 is handled in a similar manner as buckets B1, B2, and B3. In this regard, the vector of the sum ($\Sigma$(PA,TA)) is determined by adding the individual contribution for each owned competitor network in bucket B4, which is found in the row for 0-30 minute (first 30-miniute) period of the base matrix 200 illustrated in FIG. 2A, for a period of, for example, 1 year. Since different shows may be presented in the 0-30 minute period, the vector of the sum ($\Sigma$(PA,TA)) for bucket B4 is weighted. The resulting weighted vector for the summed attributes of content for the networks in bucket B4, may be represented as [W($\Sigma$(PA,TA))]D1,Bed]. An example weighted vector for the summed attributes of content for the networks in bucket B4 may comprise 60% light content, 30% news, and 10% sport, and is represented by reference number 232e-1.

One method for generating the vectors is to utilize the variables that are generated with respect to FIG. 2A, and FIG. 2B to estimate the parameters of this statistical model (the betas) by maximum likelihood estimation techniques.

This may be repeated for all the demos in the 0-30 minute period, so that each demo may have a corresponding $\beta$ vector. Once all the demos for the 0-30 minute period are completed, the entire process may be repeated for the second 30-minute period (30-60), and so on until all corresponding values of $\beta$ for all demos in the $48^{th}$ 30-minute period are completed.

The model illustrated in FIGS. 2A and 2B may be utilized for predictive modeling to determine viewership for an upcoming quarter. Once the $\beta$ vector for a particular network is determined, this may be utilized to forecast or predict the viewership for an upcoming quarter for the particular network. In order to forecast the viewership for TBS for the upcoming quarter, the program schedule for the TBS and the program schedule for the competing networks are needed. Assume that today is Apr. 5, 2015, which is roughly the start of the second quarter 2Q15, and that the model illustrated in FIG. 2A and FIG. 2B includes data for the prior four quarters, namely, 2Q14, 3Q14, 4Q14, and 1Q15. Furthermore, it is assumed that all ratings and viewership information, for example, Nielsen data, for all prior periods have been received and are included in the model illustrated in FIG. 2A and FIG. 2B.

While the program schedule for the TBS network for 2Q15 is known, the program schedule for the competitors may not be known. However, it may be assumed that the mix of program for the upcoming quarter is the same as it was for the same quarter in the prior year. Accordingly, an assumption is made that the mix of program for 2Q15 is approximately the same as the mix of program in 2Q14, which may be determined from the bucketized networks as illustrated in FIG. 2B (e.g. 231b-1, 232c-1, 232d-1, 232e-1). If it is known that there is a change to the programming in a particular bucket, then the program mix in the bucket may be adjusted accordingly. This information may be utilized to forecast the viewership for every demo, and for every 30-minute period in the upcoming quarter utilizing the values that were calculated for β. The entire process may be repeated for other networks in order to forecast viewership for those other networks for the upcoming quarter. Furthermore, the various embodiments of the disclosure are not limited to forecasting the current quarter, Q215. Accordingly, the model presented in FIG. 2A and FIG. 2B may also to utilize to forecast or predict viewership for 3015, for example.

Since consumer behavior is constantly changing, the β vector for a particular network may be updated based on these changes in the consumer behavior. Accordingly, for example, once all the data for a quarter has been received, the β vector for each particular network may be updated to reflect the changes in consumer behavior. In this regard, the estimates of the model parameters may be updated on a regular basis based on new data.

Although the various embodiments of the disclosure presented with respect to the model in FIG. 2A and FIG. 2B are utilized to predict the viewership for an owned network, it should be recognized that the disclosure is not limited in this regard. Accordingly, the model in FIG. 2A and FIG. 2B may also be utilized to predict viewership for competitor networks.

Programming optimization comprises, for example, two high-level components. The first high-level component provides the capability to generate estimates of all possible permutations of a program schedule based on a dictionary or library of available TV programs. In this regard, the first high-level component may be utilized to model "what if" scenarios. The second high-level component is operable to generate an optimal schedule based on a given set of characteristics associated with a plurality of programs.

The first high-level component is operable to utilize a model for audience rating estimation to model the effect on certain changes on the audience or viewership. In this regard, information generated by the framework for audience rating estimation may be utilized determine how audience or viewership may be impacted by certain changes. For example, consider Seinfeld which normally airs on TBS in the 8:00-8:30 pm period, and for which the viewership is known. A programmer that schedules programs for the different 30-minute periods may have a desire to know how the viewership for Seinfeld would be impacted if Seinfeld was moved from the 8:00-8:30 pm period to the 8:30-9:00 pm period. Since the β vectors are already known, and the prior year's programming schedule of the competitors may estimated, the framework for audience rating estimation may be utilized to determine estimates of the viewership for Seinfeld being shown in the 8:30-9:00 pm period. The estimates for the viewership for Seinfeld being shown in the 8:30-9:00 pm period may then be compared to the known viewership for Seinfeld being shown in the 8:00-8:30 pm period.

Similarly, the framework for audience rating estimation may be utilized to determine the impact in viewership if Seinfeld was switched with another show, and the other show was aired on TBS in the 8:00-8:30 pm period. By way of illustration, for example, consider Family Guy which normally airs on TBS in the 9:00-9:30 pm period, and for which the viewership are known. A programmer that schedules programs for the different 30-minute periods may have a desire to know how the viewership for Seinfeld and Family Guy would impacted if Seinfeld was moved from the 8:00-8:30 pm period to the 9:00-9:30 pm period. The framework for audience rating estimation may be utilized to determine estimates of the viewership for Seinfeld being shown on TBS in the 9:00-9:30 pm period, and Family Guy being shown on TBS the 8:00-8:30 pm period. The estimates for the viewership for Seinfeld being shown in the 9:00-9:30 pm period, and Family Guy being shown on TBS the 8:00-8:30 pm period may then be compared to the known viewership for Seinfeld and Family Guy to determine the impact of the switch. Notwithstanding, all permutations of a program schedule may be considered.

When the programmer receives a new program, the programmer may utilize the framework for audience rating estimation to generate estimates based on parameters that may be utilized for similar programs. Accordingly, regardless of whether the programmer may be moving, switching, tweaking, adjusting, and/or shuffling the placement of one or more programs, the framework for audience rating estimation may be utilized to estimate the impact on the audience or viewership with a certain statistical confidence.

The programming of content including programs may be dependent on one or more soft or hard constraints that may be associated with the content. In some instances, content may not be constrained. The constraints may be incorporated in the characteristics of a program. Given a blank or partial schedule, available programs and corresponding program characteristics, various embodiments of the disclosure may be operable to utilize a mixed integer programming model defined over a time expanded network to generate an optimal or best schedule that may provide the greatest audience or viewership based on the estimated viewership generated by model for audience rating estimation. For example, the mixed integer model may be utilized to determine how Family Guy, and Seinfeld should be scheduled for airing during between 7:00 pm-9:30 pm in order to receive maximum viewership.

The mixed integer model provides an approach to optimize a schedule given the inputs from the framework for audience rating estimation. The mixed integer model utilizes a plurality of discrete and continuous variables to represent the attributes or covariates associated with the programs. The following is an exemplary objective function of the mixed integer programming model that may be utilized to generate an optimal schedule:

$$\text{Max}\left\{\sum w \cdot \hat{A}_{s_{j_i}}^{s_{x_i}} \cdot X_{s_i t_i}^{s_j t_j}\right\}$$

$$\hat{A}_{s_{j_i}}^{s_{x_i}}$$

represents the estimated audience or viewership
$X_{s_i t_i}^{s_j t_j}$ represents the placement of program/show $s_i$ at time $t_i$, and the preceding program/show $s_j$ at time $t_j$
w represents a weighting factor.

It may not be appropriate to sum all the parameters without accounting for differences in demographics (demos). According the weighting factor w may be utilized to account for differences in the demographics (demos). For example, to add one additional unit of demo F[40-49] (female, age 40-49), it may be necessary to include demo F[18+] (females age 18 and older). In other words, since the demo F[18+] is much larger than the demo F[40-49], then demo F[18+] provides a greater probability of receiving the additional unit. Accordingly, the weighting factor w, may be utilized to weigh the demos and a per demo basis.

Figure 3A:
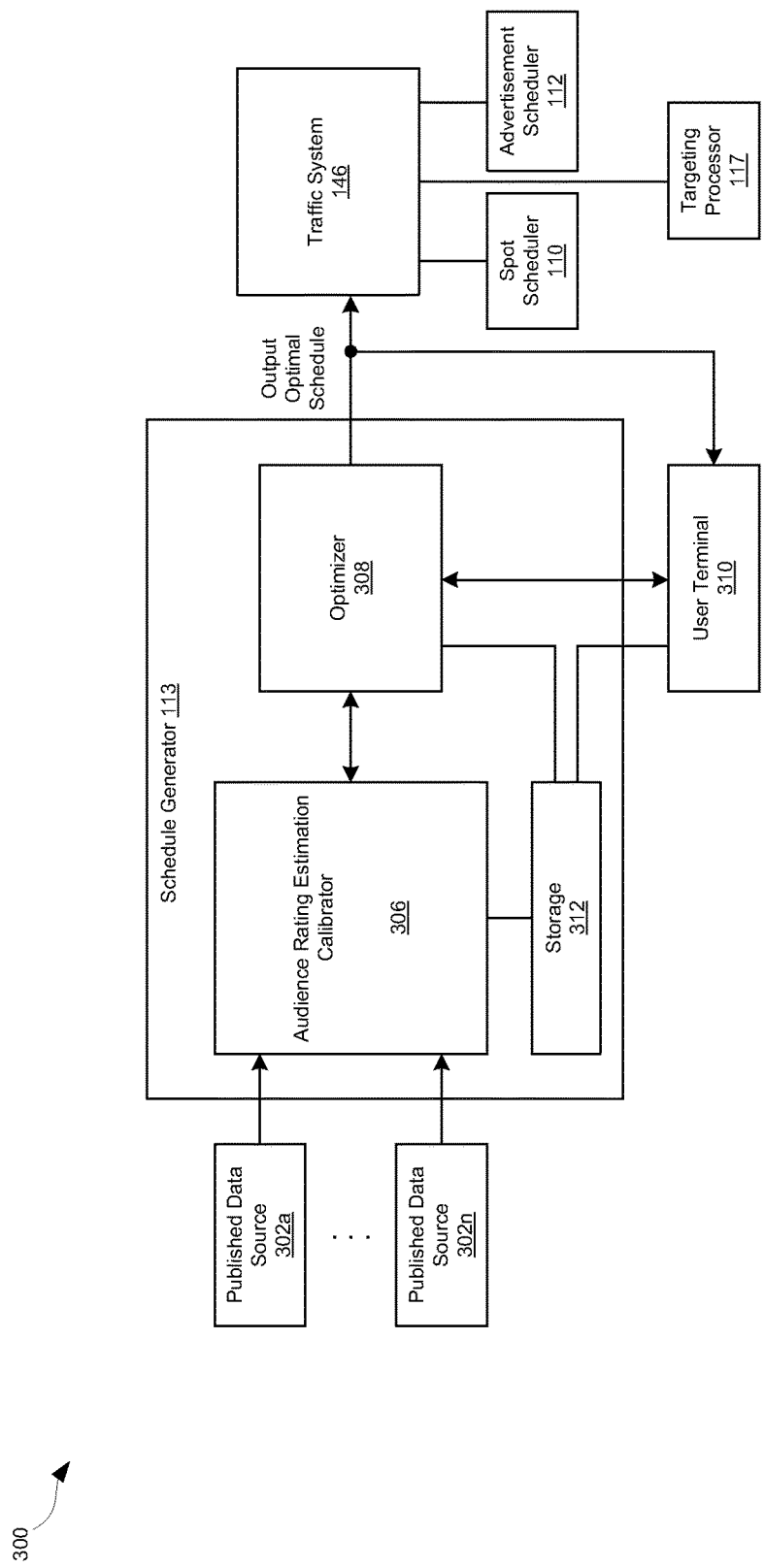
FIG. 3A is a high-level block diagram of illustrating the generation of an optimized schedule by a schedule generator, in accordance with an exemplary embodiment of the disclosure.

FIG. 3A is a high-level block diagram of illustrating the generation of an optimized schedule by a schedule generator, in accordance with an exemplary embodiment of the disclosure. Referring to FIG. 3A, there is shown a plurality of published data sources $302a, \ldots, 302n$, a schedule generator 113, a user terminal 310, a storage 312, a traffic system 146, spot scheduler 110, and advertisement scheduler 112. The schedule generator 113 may comprise an audience rating estimation calibrator 306, and an optimizer 308.

The audience rating estimation calibrator 306, which may be referred to as the calibrator 306, may comprise suitable logic, circuits, and interfaces that may be operable to execute code that may be operable to receive from one or more of the plurality of published data sources $302a, \ldots, 302n$, historical audience data that have viewed a program that was previously aired. The calibrator 306 may be operable to calibrate the model for audience rating estimation based on the historical audience data. The calibration of the model for audience rating estimation may include translating characteristics of the programs into a plurality of variables, which are incorporated into the time expanded network. The calibrator 306 may then communicate the variables and program information to the optimizer 308.

The optimizer 308 may comprise suitable logic, circuits, and interfaces that may be operable to execute code that utilizes a utilizes a time expanded network in which each node represents an assignment of a show to a specific time period, with a specific stacking, and preceded by a lead-in show to generate an output optimal schedule that provides the highest estimated audience based on the calibrated model for audience rating estimation. In this regard, the schedule generator 113 may be operable to utilize programming optimization to find the output optimal schedule assignment of programs or shows to time periods that will maximize the total resulting estimated audience based on the calibrated model for audience rating estimation. The output optimal schedule generated by the optimizer 308, may be communicated by the program manager 114 and/or the schedule generator 113 to the traffic system 146, the user terminal 310, and/or the storage 312. The traffic system 146 may communicate information from the optimal schedules to, for example, the spot scheduler 110, and/or the advertisement scheduler 112. For example, the program manager 114 and/or the schedule generator 113 may communicate information from the optimal schedule to the spot scheduler 110, which may be operable to utilize the information from the optimal schedule to control the placement of one or more spots, and the advertisement scheduler 112 may be operable to utilize the information from the optimal schedule to shuffle placement of the one or more spots based liability per pending spot or other metric. Information from the optimal schedules may also be utilized to control the targeting of one or more spots.

The user terminal 310 may comprise suitable logic, circuits, and interfaces that may be operable to execute code that generates a user interface that may enable a user such as a programmer to interact with the schedule generator 113. The user may interact with the user terminal 310 via one or more of keypad, display, speaker, microphone, and a pointing device. The user terminal may present one or more screens that may enable the user to enter characteristics that may be associated with a show. The characteristics may then be translated into variables that may be communicated to and/or utilized by the optimizer 308 to generate an optimal schedule.

The storage 312 may be, for example, any kind storage device such as a disc, solid state memory, or other storage system such as a network attached storage system (NAS) or cloud-based storage system. The estimates for the framework for audience rating estimation may be stored by demographics and/or by target, and may be stored in a database within the storage 312. The storage 312 may also be operable to store a dictionary or library of available TV programs.

In accordance with one embodiment of the disclosure, when generating estimates for all possible permutations of a program schedule based on a dictionary or library of available TV programs, the user terminal 310 may enable a programmer to utilize the framework for audience rating estimation to model the effect of certain changes in the scheduling of programs on the expected audience or viewership. In this regard, the programmer may utilize the user terminal 310 to enter or otherwise identify the programs that will be utilized by the framework for audience rating estimation. The framework for audience rating estimation may be calibrated based on historical historical audience data. The characteristics for the programs may be translated into a set of variables that are incorporated into the time expanded network. The optimizer 308 may be operable to utilize the time expanded network to determine a first optimal schedule that will provide the estimated audience or viewership based on stacking and lead-in program associated with the characteristics of the programs. The programmer may then utilize the user terminal 310 to enter new characteristics for the programs, which may be translated into a new set of variables that are incorporated into the time expanded network. The optimizer 308 may be operable to utilize the time expanded network to determine a second optimal schedule that will provide the estimated audience or viewership based on stacking and lead-in program associated with the new characteristics of the programs. The programmer may then utilize the user terminal 310 to compare the first, and the second optimal schedules and their corresponding estimated audiences to determine the impact of the changes in the characteristics for the programs on the estimated audience or viewership.

In accordance with an aspect of the disclosure, the framework for audience rating estimation may be operable to handle new programs and may be operable to generate estimated audience or viewership for the new programs.

In accordance with an embodiment of the disclosure, the user terminal 310 may be utilized to enter characteristics for one or more programs, and the characteristics and corresponding program information may be stored in a configuration file, which may be accessed by the optimizer 308. For example, the configuration file may be stored in the storage 312. In this regard, the schedule generator 113 may operate independent of the user terminal 310 with little or no intervention from user terminal 310.

For illustration, consider the following example in which each day of the week is divided into four (4) distinct time periods, namely, early morning (EM), daytime (D), primetime (P), and late night (LN). It should be recognized that the number of time periods and nature of the time periods may vary depending on implementation and is not intended to limit the various embodiments of the disclosure. The days Monday (M), Tuesday (Tu), Wednesday (W), Thursday (Th), and Friday (Fr) may be referred to as Dayweek (DWk). The days Saturday (Sa), and Sunday (Su) may be referred to as Weekend (Wke).

| Hours | M | Tu | W | Th | Fr | Sa | Su |
|---|---|---|---|---|---|---|---|
| Early morning (EM) | | | | | | | |
| Daytime (DT) | | | | | | | |
| Primetime (PT) | | | | | | | |
| Late night (LN) | | | | | | | |

Furthermore, consider the variable of characteristics and options for the following programs, namely, p1, p2, p3, p4, and p5:

p1 ∈ {DWk, PT}, stacking=3, leadin=p20 (program 20)
p2 ∈ {M, W, Th, DT}, stacking=1, leadin=p70 (program 70)
p3 ∈ {DWk, LN}, stacking=2, leadin=p49 (program 49)
p4 ∈ {Weekend}, stacking=4, leadin=p10 (program 10)
p5 ∈ {ALL}, stacking=4, leadin=p100 (program 100)

The program p5 has the variable ALL meaning it includes the characteristic of all possible placements on the schedule. The program p2 has a stacking of 1, which means p2 is not repeated. The stacking and leadin may be referred to as options. Notwithstanding, there may be a maximum stacking as a constraint, and may be a limiting number of programs that may precede other programs.

Figure 3B:
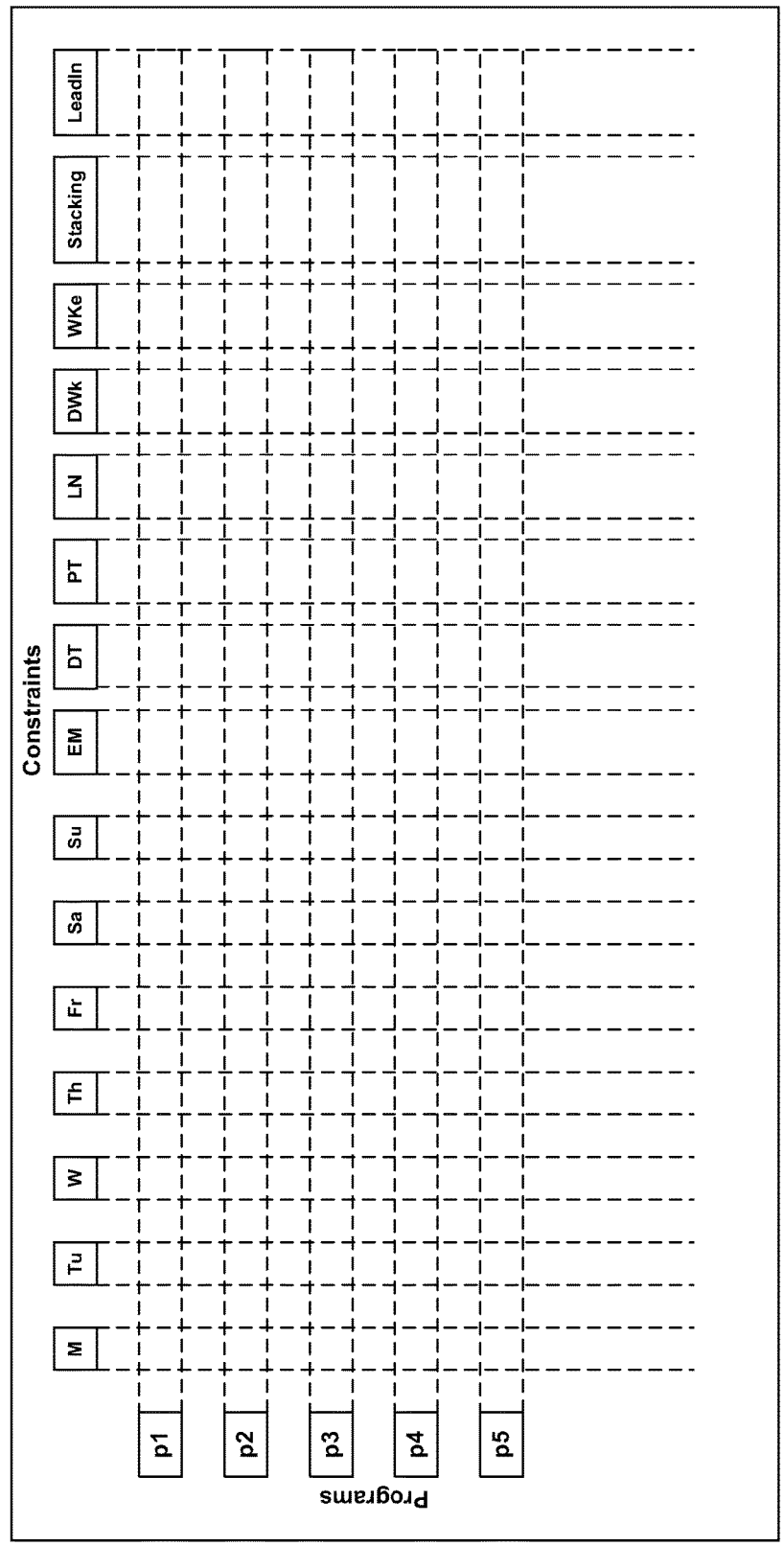
FIG. 3B is a diagram that illustrates a graphical user interface that may be displayed by a user terminal for entering program information and variables for program characteristics, in accordance with an exemplary embodiment of the disclosure.

FIG. 3B is a diagram that illustrates a graphical user interface that may be displayed by a user terminal for entering program information and variables for program characteristics, in accordance with an exemplary embodiment of the disclosure. Referring to FIG. 3A, there is shown a graphical user interface 330 in which program information and variables for program characteristics may be entered. The graphical user interface 330 may be displayed by the user terminal 310.

Figure 3C:
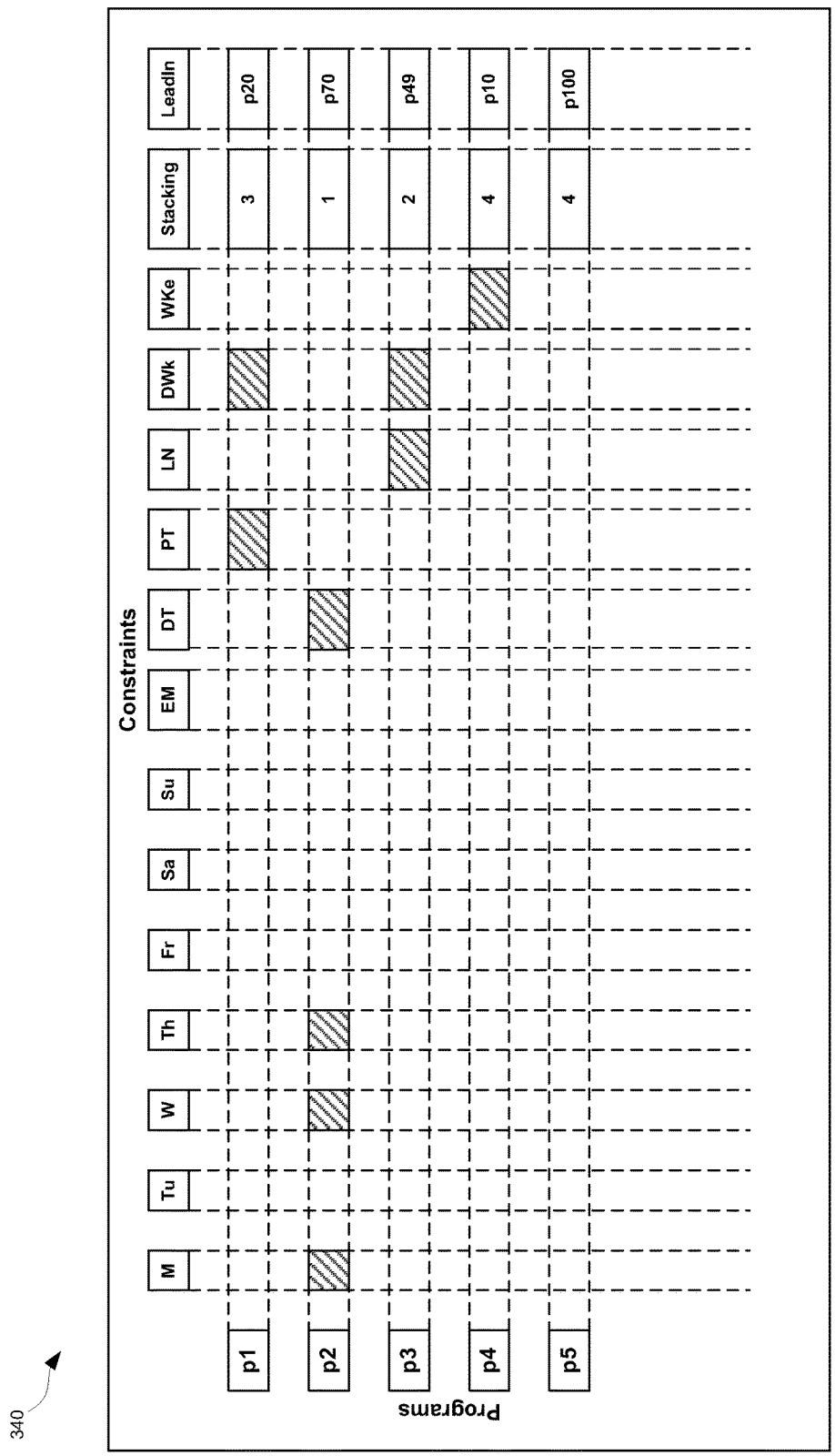
FIG. 3C is a diagram that illustrates the graphical user interface of FIG. 3B with corresponding variables for program characteristics, in accordance with an exemplary embodiment of the disclosure.

FIG. 3C is a diagram that illustrates the graphical user interface of FIG. 3B with corresponding variables for program characteristics, in accordance with an exemplary embodiment of the disclosure. Referring to FIG. 3C, there is shown a graphical user interface 340 with example variables for the programs p1, p2, p3, p4, and p5. The graphical user interface 330 may be displayed by the user terminal 330.

In general, scheduling problems present certain challenges when solving due to their combinatorial nature. Programming optimization involves finding an optimal schedule assignment of programs or shows to time periods that maximizes the total resulting estimated audience. A straight forward mixed-integer programming formulation for this problem entails defining a binary variable for each possible assignment of a program to a time period. However, the expected audience resulting from scheduling a show to a specific time period is not independent of the expected audience of other assignments of shows to programs. In particular, the audience of a show is significantly impacted by its lead-in show, which is the show airing right before. Additionally, the lead-in effects are compounded if the same show is aired several times back to back, which is referred to as stacking. Modeling the effects of lead in and stacking using the straightforward approach leads to a complex mixed integer quadratic programming problem that is very difficult to solve (or in some cases not possible) even with state-of-the-art solvers.

In order to circumvent this difficulty, in accordance with various embodiments of the disclosure, the schedule generator 113 may be operable to provide an alternative model based on network flows on a time expanded network in which each node represents an assignment of a show to a specific time period, with a specific stacking, and preceded by a lead-in show or program. The term show and program may be used interchangeably. Details about network flow models can be found on Ahuja, et. al. Network Flows: Theory, Algorithms, and Applications. 1993.

Figure 4:
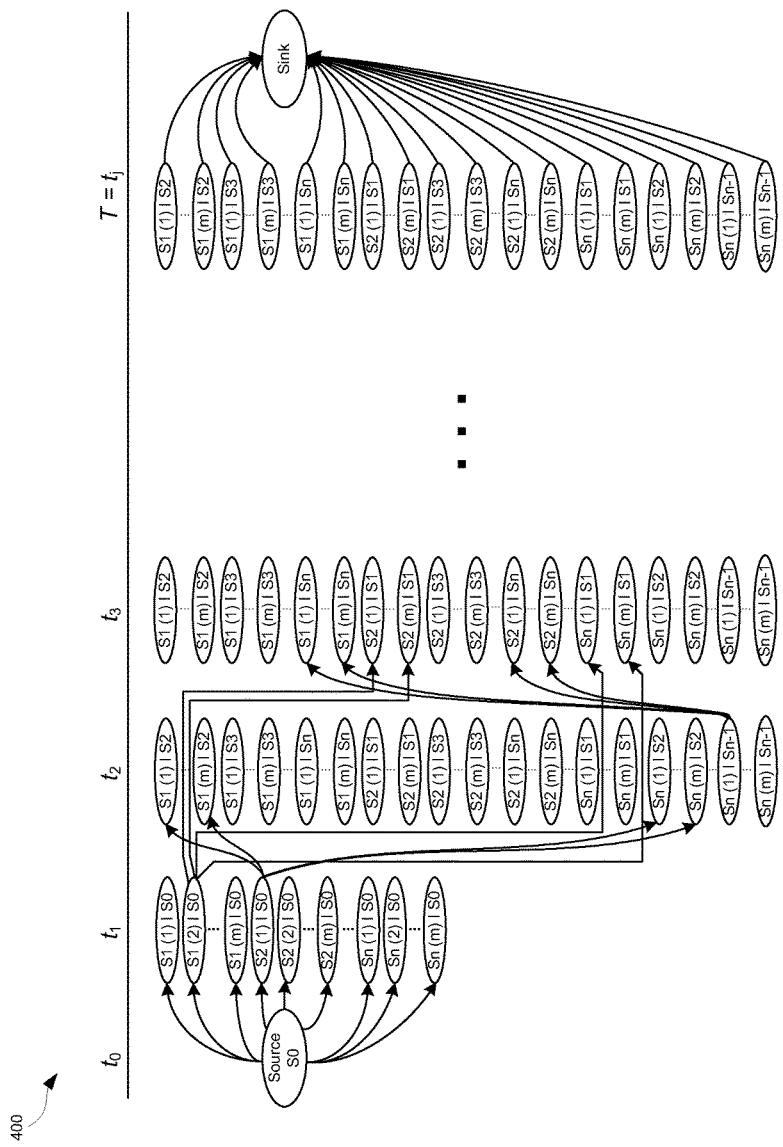
FIG. 4 is a diagram that illustrates an exemplary time expanded network utilized to build a network flow model that may be implemented by a schedule generator to generate an optimal schedule that will maximize estimated audience, in accordance with an exemplary embodiment of the disclosure.

FIG. 4 is a diagram that illustrates an exemplary time expanded network utilized to build a network flow model that may be implemented by a schedule generator to generate an optimal schedule that will maximize estimated audience, in accordance with an exemplary embodiment of the disclosure. Referring to FIG. 4, there is shown a subset of the nodes and arcs that appear in this time expanded network. It is assumed that the starting point is $t_0$ and that show $s_0$ has already been scheduled at time $t_0$. There are n available shows to schedule and they can be stacked a maximum of m times. The planning horizon is T, which can be, for example, a week, a quarter, or any desired time period. The planning horizon is divided into j scheduling periods, which may be, for example, half-hours or hours depending on the granularity of scheduling for the network (for instance TNT never schedules shows shorter than 1 hour, but TBS schedules 30-minute shows). The notation of the nodes (Si(k)|Sj) at time t indicates scheduling show i, starting at time t, stacked k times, given that the show is preceded by show j.

The arcs between the nodes represent feasible transitions between scheduled shows. Some examples are:

1) an arc exists from node (S2(1)|S0) at time $t_1$ to node (S1(1)|S2) at time $t_2$ because it is possible to schedule show 1 with a stack of 1 at time $t_2$, after show 2 with a stack of 1 has been scheduled at time $t_1$;
2) an arc exists from node (S1(2)|S0) at time $t_1$ into node (S2(m)|S1) at time $t_3$ because it is possible to schedule show 2 with a stack of m at time $t_3$, after show 1 with a stack of 2 has been scheduled at time $t_1$.

In contrast, there cannot be an arc from node (S2(2)|S0) at time $t_1$ into node (S1(1)|S2) at time $t_2$ because it is not possible to schedule show 1 at time $t_2$ when show 2 has been scheduled at time $t_1$ with a stack of 2; there cannot be an arc from node (S2(1)|Sn) at time $t_2$ into node (Sn(1)|S1) at time $t_3$ because it is not feasible to schedule show n at time $t_3$ given that is preceded by show 1 when show 2 has been scheduled at time $t_2$ with a stack of 1; also there cannot be arcs from any of the nodes in time $t_i$ to any nodes in time $t_j \leq t_i$ because programming schedules cannot go back in time.

A metric such as a profit is associated with each of the feasible arcs that indicates the estimated audience that would result from that scheduling transition. The schedule generator 113 may utilize the framework for audience rating estimation to compute all the required estimates. Under this formulation, any path from the source node to the sink node represents a feasible schedule and the sum of the profits on all the arcs in that path is the total audience resulting from that schedule. Therefore, the problem of finding the schedule that maximizes the expected audience reduces to finding the path (or cycle in the case of a repeatable schedule) with maximum total profit from the source node to the sink node. This problem can then be formulated as a mixed integer programming problem to find its optimal solution.

Programming optimization is also subject to a number of constraints that limit the potential scheduling of programs to specific time periods. In general, these constraints can be classified in two main types: time window constraints, and cardinality constraints.

Time window constraints limit the time periods in which each one of the shows can be scheduled. Examples of time window constraints include licensing constraints, and barter constraints. Licensing constraints prevent scheduling a syndicated show at the same time that a new episode of that show is broadcast on its original network (e.g. Castle cannot be scheduled on Mondays at 10:00 pm, when it airs on ABC), day of week constraints (some shows can only be shown on weekdays versus weekends or on specific days). Barter constraints occur when a deal is discounted if a show is presented along with a commercial. For example, Warner Brothers may provide a deal with a 3% discount if Turner airs Big Bang Theory along with a 6-minute commercial. The 6-minute commercial time may be a generic window, for example between 6:00 pm and 10:00 pm. If Turner accepts the deal, then Turner is obligated to meet the barter constraints and air the Big Bang Theory and the 6-minute commercial between 6:00 pm and 10:00 pm.

For cardinality constraints, when shows are licensed, contractual obligations estipulate that a minimum number of episodes must be aired per week, with an additional optional number of episodes that could also be aired. The maximum number of episodes per week that can be aired equals the minimum plus optional airings. For these reasons, a network typically purchases more runs than are needed. Cardinality constraints may also be referred to as run constraints.

The schedule generator 113 is operable to transform the constraints into mathematical expressions using the same variables established in the network flow model formulation described above and become part of the mixed integer program. Additional constraints limiting the placement times and/or number of episodes that can air per week, quarter, etc. can also be incorporated into the model.

Figure 5:
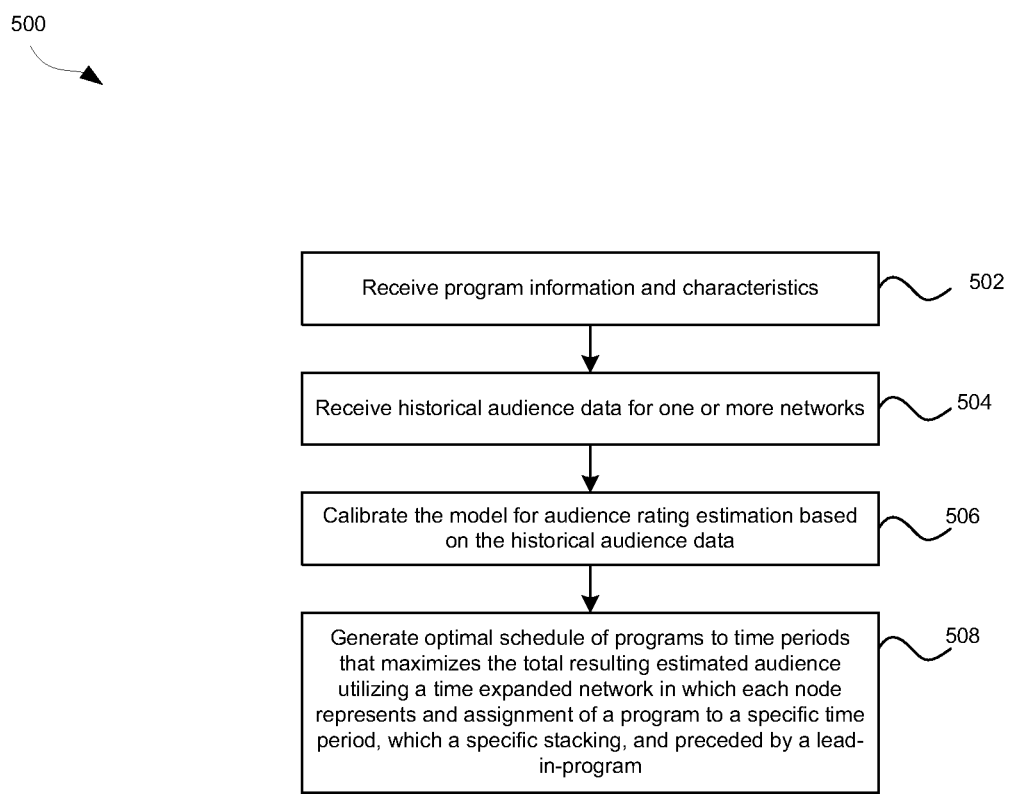
FIG. 5 is a flow chart illustrating exemplary steps for generating an optimal schedule of programs that will maximize the total resulting estimated audience, in accordance with an exemplary embodiment of the disclosure.

FIG. 5 is a flow chart illustrating exemplary steps for generating an optimal schedule of programs that will maximize the total resulting estimated audience, in accordance with an exemplary embodiment of the disclosure. Referring to FIG. 5, there are shown exemplary steps 502 through 508.

In step 502, program information and characteristics are received. In step 504, historical audience data for one or more networks are received. In step 506, the model for audience rating estimation is calibrated based on the historical audience data. In step 508, an optimal schedule of programs to time periods that maximizes the total resulting estimated audience utilizing a time expanded network in which each node represents and assignment of a program to a specific time period, which a specific stacking, and preceded by a lead-in-program. The exemplary steps 502 through 508 may be executed by the schedule generator 113.

Figure 6:
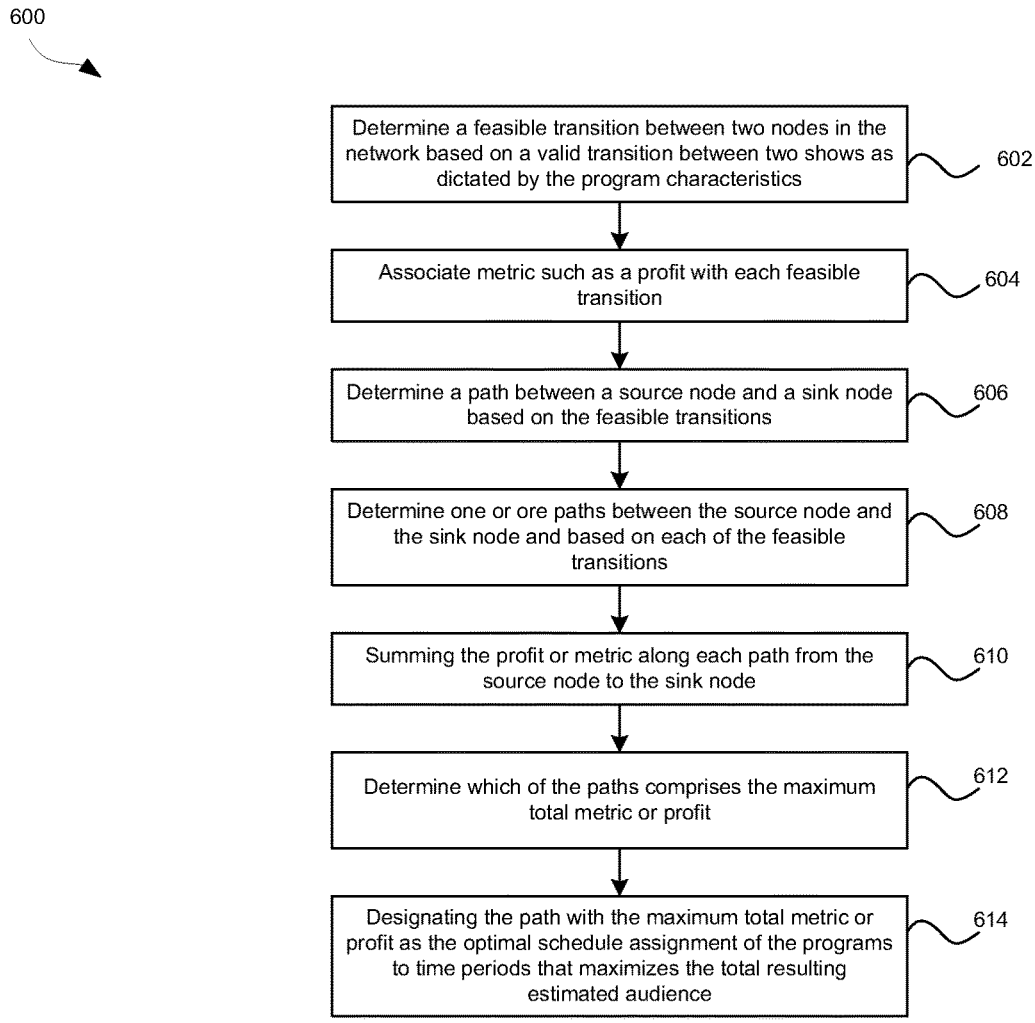
FIG. 6 is a flow chart illustrating exemplary steps for generating an optimal schedule of programs that will maximize the total resulting estimated audience, in accordance with an exemplary embodiment of the disclosure.

FIG. 6 is a flow chart illustrating exemplary steps for generating an optimal schedule of programs that will maximize the total resulting estimated audience, in accordance with an exemplary embodiment of the disclosure. Referring to FIG. 6, there are shown exemplary steps 602 through 614. The exemplary steps 602 through 614 may be executed by the schedule generator 113.

In step 602, a feasible transition between two nodes in the network based on a valid transition between two shows as dictated by the program characteristics may be determined. In step 604, a metric such as a profit may be associated with each feasible transition. In step 606, a path between a source node and a sink node may be determined based on the feasible transitions. In step 608, one or more paths between the source node and the sink node may be determined based on each of the feasible transitions. In step 610, the profit or metric may be summed along each path from the source node to the sink node. In step 612, a determination is made as to which of the paths comprises the maximum total metric or profit. In step 614, the path with the maximum total metric or profit may be designated as the optimal schedule assignment of the programs to time periods that maximizes the total resulting estimated audience.

Figure 7:
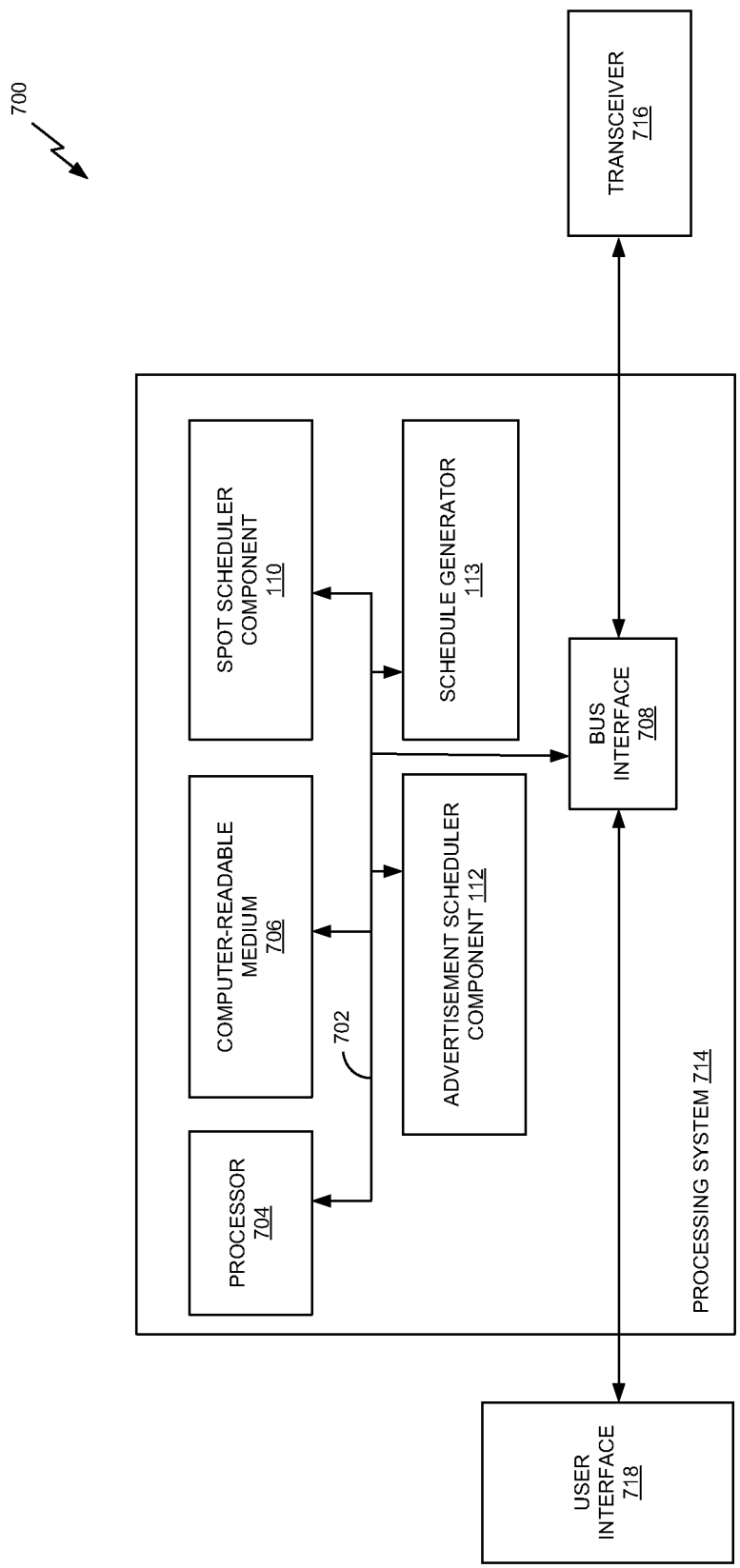
FIG. 7 is a conceptual diagram illustrating an example of a hardware implementation for a television advertisement management system employing a processing system for generating an optimal schedule of programs that will maximize the total resulting estimated audience, in accordance with an exemplary embodiment of the disclosure.

FIG. 7 is a conceptual diagram illustrating an example of a hardware implementation for a television advertisement management system employing a processing system for generating an optimal schedule of programs that will maximize the total resulting estimated audience, in accordance with an exemplary embodiment of the disclosure. Referring to FIG. 7, the hardware implementation for the television advertisement management system 100 of FIG. 1A employs a processing system 714 for generating an optimal schedule of programs that will maximize the total resulting estimated audience, in accordance with an exemplary embodiment of the disclosure, as described herein. In some examples, the processing system 714 may comprise one or more hardware processors 704, a spot scheduler solver component 110, an advertisement scheduler component 112, and a schedule generator component 113.

In this example, the television advertisement management system employing a processing system 714 may be implemented with a bus architecture, represented generally by the bus 702. The bus 702 may include any number of interconnecting buses and bridges depending on the specific implementation of of the television advertisement management system 100 (FIG. 1A) and the overall design constraints. The bus 702 links together various circuits including the one or more processors, represented generally by the processor 704, the computer-readable media, represented generally by the computer-readable medium 706, spot scheduler component 110, schedule generator 113, (which correspond to the spot scheduler 110, advertisement scheduler 112, and schedule generator 113, respectively, illustrated in FIG. 1A), which may be configured to carry out one or more methods or procedures described herein.

The bus interface 708 provides an interface between the bus 702 and a transceiver 716. The transceiver 716 provides a means for communicating via the network 120 with various other apparatus such as the advertiser order generation systems 130a, ..., 130n and the consumer devices 132a, ..., 132n (FIG. 1A). The user interface 718 (e.g., keypad, display, speaker, microphone, pointing) may also be provided to enable a user to interact with the television advertisement management system 100 (FIG. 1A).

The processor 704 may be operable to manage the bus 702 and general processing, including the execution of software stored on the computer-readable medium 706. The software, when executed by the processor 704, causes the television advertisement management system 1 (FIG. 1A) to perform the various functions described infra for any particular apparatus. The computer-readable medium 706 may also be used for storing data that is manipulated by the processor 704 when executing software.

In an aspect, processor 704, computer-readable medium 706, or a combination of both may be configured or otherwise specially programmed to perform the functionality of the spot scheduler component 110, advertisement scheduler component 112, schedule generator 113, components thereof, etc. (corresponding to the spot scheduler 110, advertisement scheduler 112, schedule generator 113, respectively, see FIG. 1A), or various other components described herein. For example, processor 704, computer-readable medium 706, or a combination of both may be configured or otherwise specially programmed to perform the functionality of the spot scheduler component 110, advertisement scheduler component 112, schedule generator 113, components thereof, etc. described herein (e.g., the method 300 in FIG. 3A, method 500 in FIG. 5, the method 600 in FIG. 6, etc.), and/or the like.

Various embodiments of the disclosure provide for a television program scheduling system 101, for example, which may comprise a program manager 114, and a schedule generator 113. The television program scheduling system 101 may be operable to communicate with a plurality of advertiser order generation systems 130a, . . . , 130n, and electronically receives, via a communication network 120, deals identifying shows and corresponding constraints for scheduling the shows. The television program scheduling system 101 may be operable to receive from one or more published data sources, historical audience data for previous telecasts of the shows on one or more television networks, and calibrates the model for audience rating estimation based on the historical audience data. The schedule generator 113 in the television program scheduling system 101 may be operable to generate an optimal schedule assignment of the shows to time periods that maximizes the total resulting estimated audience based on the calibrated model for audience rating estimation. The schedule generator 113 may be operable to generate the optimal schedule utilizing a time expanded network in which each node represents an assignment of a show to a specific time period, with a specific stacking, and preceded by a lead-in show. A feasible transition between two nodes represents a valid transition between two shows.

The schedule generator 113 may be operable to associate a profit or other metric with each feasible transition, and the profit or metric may represent an estimate of audience that would result from scheduling the transition between the two shows. The schedule generator 113 may be operable to determine a path between a source node and a sink node based on each of the feasible transitions, and determine one or more paths between a source node and a sink node based on each of the feasible transitions, where each of the one or more paths represents a feasible schedule, and sums the profit associated with each feasible transition along each of the one or more paths. The schedule generator 113 may be operable to determine which path of the one or more paths from the source node to the sink node comprise a maximum total profit, and designate the path that is determined to have the maximum total profit as the optimal schedule assignment of the shows to time periods that maximizes the total resulting estimated audience. For calibration of the model for audience rating estimation, the schedule generator 113 may be operable to translate characteristics of the shows into a plurality of variables, which are incorporated into the time expanded network. The generation of the optimal schedule assignment may comprise an iterative process.

The calibration of the model for audience rating estimation based on historical audience data and the generation of an optimal schedule assignment of the shows to time periods that maximizes the total resulting estimated audience based on the calibrated model for audience estimation, and the time expanded network in which each node represents an assignment of a show to a specific time period, with a specific stacking, and preceded by a lead-in show enables the television program scheduling system 101 and the television advertisement management system 100 to operate more efficiently. For example, the calibration of the model for audience rating estimation based on historical audience data enables the television program scheduling system 101 to utilize less memory than would otherwise be required resulting in much faster processing time (faster computation time without sacrificing accuracy). Furthermore, the optimal schedule is generated much faster that traditional means, and the optimal schedule may be propagated faster to the television advertisement management system 100 where it can immediately impact the operation of the advertisement schedule 112 and the spot schedule solver 110.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for the advertisement scheduler 112.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present invention has been described with reference to certain embodiments, it will be noted understood by, for example, those skilled in the art that various changes and modification could be made and equivalents may be substituted without departing from the scope of the present invention as defined, for example, in the appended claims. In addition, many modifications may be made to adapt a particular situation or material to the teachings of the present invention without departing from its scope. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Therefore, it is intended that the present invention not be limited to the particular embodiment disclosed, but that the present invention will include all embodiments falling within the scope of the appended claims.

What is claimed is:

1. A method, comprising:
in an advertisement program scheduling system:
receiving from at least one advertiser order generation system, via a communication network, first information corresponding to deals identifying a plurality of shows and constraints for scheduling the plurality of shows;
receiving from at least one published data source, historical audience data related to previous telecasts of the plurality of shows on at least one television network;
determining at least one attribute of each of the plurality of shows, based on the first information;
calibrating a model for audience rating estimation based on the historical audience data and the at least one attribute of each of the plurality of shows,
wherein the at least one attribute comprises at least one of a genre or a duration of a first show among the plurality of shows; and
generating second information that corresponds to an optimal schedule assignment of the plurality of shows to time periods, based on the calibrated model and a time expanded network that includes a plurality of nodes,
wherein each of the plurality of nodes represents an assignment of a second show among the plurality of shows to a specific time period, with a specific stacking, and preceded by a lead-in show, and
wherein each of the plurality of nodes is based on at least a first variable that corresponds to a translation of at least a first characteristics of the second show.

2. The method according to claim 1, wherein each of a plurality of feasible transitions of a plurality of transitions between two nodes of the plurality of the nodes represents a valid transition between a third show of the plurality of shows and a fourth show of the plurality of shows.

3. The method according to claim 2, further comprising associating a profit with each of the plurality of feasible transitions, wherein the profit represents an estimate of audience expected from scheduling the feasible transition between the third show and the fourth show.

4. The method according to claim 3, further comprising determining a path between a source node of the plurality of nodes and a sink node of the plurality of nodes, based on each of the plurality of feasible transitions.

5. The method according to claim 4, further comprising determining a plurality of paths between the source node and the sink node based on each of the plurality of feasible transitions, wherein each of the plurality of paths represents a feasible schedule.

6. The method according to claim 5, further comprising summing the profit associated with each of the plurality of feasible transitions along each of the plurality of paths.

7. The method according to claim 6, further comprising determining a first path of the plurality of paths from the source node to the sink node that comprises a maximum total profit.

8. The method according to claim 7, further comprising designating the first path as said optimal schedule assignment of the plurality of shows to time periods that maximizes a total resulting estimated audience.

9. The method according to claim 1,
wherein the calibrating of the model for audience rating estimation comprises translating second characteristics of each of the plurality of shows into a plurality of second variables, and
wherein each of the plurality of second variables is incorporated into the time expanded network.

10. The method according to claim 1, wherein the generation of the second information is an iterative process.

11. A system, comprising:
an advertisement program scheduling system; and
at least one advertiser order generation system,
wherein the advertisement program scheduling system comprises circuitry configured to:

receive from the at least one advertiser order generation system, via a communication network, first information corresponding to deals identifying a plurality of shows and constraints for scheduling the plurality of shows;

receive from at least one published data source, historical audience data related to previous telecasts of the plurality of shows on at least one television network;

determine at least one attribute of each of the plurality of shows, based on the first information;

calibrate a model for audience rating estimation based on the historical audience data and the at least one attribute of each of the plurality of shows,
wherein the at least one attribute comprises at least one of a genre or a duration of a first show among the plurality of shows; and generate second information that corresponds to an optimal schedule assignment of the plurality of shows to time periods based on the calibrated model and a time expanded network that includes a plurality of nodes,
wherein each of the plurality of nodes represents an assignment of a second show among the plurality of shows to a specific time period, with a specific stacking, and preceded by a lead-in show, and
wherein each of the plurality of nodes is based on at least a first variable that corresponds to a translation of at least a first characteristics of the second show.

12. The system according to claim 11, wherein each of a plurality of feasible transitions of a plurality of transitions between a third show of the plurality of shows and a fourth show of the plurality of shows.

13. The system according to claim 12, wherein the circuitry is further configured to associate a profit with each of the plurality of feasible transitions, wherein the profit represents an estimate of audience expected from a scheduled transition between the third show and the fourth show.

14. The system according to claim 13, wherein the circuitry is further configured to determine a path between a source node of the plurality of nodes and a sink node of the plurality of nodes, based on each of the plurality of feasible transitions.

15. The system according to claim 14, wherein the circuitry is further configured to determine a plurality of paths between the source node and the sink node based on each of the plurality of feasible transitions, wherein each of the plurality of paths represents a feasible schedule.

16. The system according to claim 15, wherein the circuitry is further configured to generate a sum of the profit associated with each of the plurality of feasible transitions along each of the plurality of paths.

17. The system according to claim 16, wherein the circuitry is further configured to determine a first path of the plurality of paths from the source node to the sink node that comprises a maximum total profit.

18. The system according to claim 17, wherein the circuitry is further configured to designate the first path as said optimal schedule assignment of the plurality of shows to time periods that maximizes a total resulting estimated audience.

19. The system according to claim 11,
wherein the calibration of the model for audience rating estimation comprises translating second characteristics of each of the plurality of shows into a plurality of second variables, and
wherein each of the plurality of second variables is incorporated into the time expanded network.

20. The system according to claim 11, wherein the circuitry is further configured to iteratively generate the second information.

21. A non-transitory computer-readable medium having stored thereon, computer-executable instructions to cause a computer to execute operations, the operations comprising:
receiving from at least one advertiser order generation system, first information corresponding to deals identifying a plurality of shows and constraints for scheduling the plurality of shows;
receiving from at least one published data source, historical audience data related to previous telecasts of a plurality of shows on at least one television network;
determining at least one attribute of each of the plurality of shows, based on the first information;
calibrating a model for audience rating estimation based on the historical audience data and the at least one attribute of each of the plurality of shows,
wherein the at least one attribute comprises at least one of a genre or a duration of a first show among the plurality of shows; and
generating second information that corresponds to an optimal schedule assignment of the plurality of shows to time periods, based on the calibrated model and a time expanded network that includes a plurality of nodes,
wherein each of the plurality of nodes represents an assignment of a second show among the plurality of shows to a specific time period, with a specific stacking, and preceded by a lead-in show, and
wherein each of the plurality of nodes is based on at least a first variable that corresponds to a translation of at least a first characteristics of the second show.

22. The non-transitory computer-readable medium according to claim 21, wherein each of a plurality of feasible transitions of a plurality of transitions between two nodes of the plurality of the nodes represents a valid transition between a third show of the plurality of shows and a fourth show of the plurality of shows.

23. The non-transitory computer-readable medium according to claim 22, wherein the operations further comprise associating a profit with each of the plurality of feasible transitions, wherein the profit represents an estimate of audience expected from scheduling the feasible transition between the third show and the fourth show.

24. The non-transitory computer-readable medium according to claim 23, wherein the operations further comprise determining a path between a source node of the plurality of nodes and a sink node of the plurality of nodes, based on each of the plurality of feasible transitions.

25. The non-transitory computer-readable medium according to claim 24, wherein the operations further comprise determining a plurality of paths between the source node and the sink node based on each of the plurality of feasible transitions, wherein each of the plurality of paths represents a feasible schedule.

26. The non-transitory computer-readable medium according to claim 25, wherein the operations further comprise summing the profit associated with each of the plurality of feasible transitions along each of the plurality of paths.

27. The non-transitory computer-readable medium according to claim 26, wherein the operations further comprise determining a first path of the plurality of paths from the source node to the sink node that comprises a maximum total profit.

28. The non-transitory computer-readable medium according to claim 27, wherein the operations further comprise designating the first path as said optimal schedule assignment of the plurality of shows to time periods that maximizes a total resulting estimated audience.

29. The non-transitory computer-readable medium according to claim 21,
wherein the calibration of the model for audience rating estimation comprises translating second characteristics of each of the plurality of shows into a plurality of second variables, and
wherein each of the plurality of second variables is incorporated into the time expanded network.

30. The non-transitory computer-readable medium according to claim 21, wherein the generation of the second information is an iterative process.

* * * * *